(12) United States Patent
Iseki et al.

(10) Patent No.: US 8,993,197 B2
(45) Date of Patent: Mar. 31, 2015

(54) BIPOLAR PLATE FOR FUEL CELL AND METHOD FOR PRODUCING THE SAME

(75) Inventors: Takashi Iseki, Aichi-gun (JP); Kazuyuki Nakanishi, Seto-shi (JP); Yasuhiro Ozawa, Aichi-gun (JP); Yuka Yamada, Toyota (JP); Hajime Hasegawa, Toyota (JP); Masafumi Koizumi, Toyota (JP); Katsutoshi Fujisawa, Toyota (JP); Naoki Ueda, Toyota (JP); Hirohiko Hisano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 259 days.

(21) Appl. No.: 13/511,175

(22) PCT Filed: Dec. 24, 2010

(86) PCT No.: PCT/JP2010/007528
§ 371 (c)(1),
(2), (4) Date: May 22, 2012

(87) PCT Pub. No.: WO2011/077755
PCT Pub. Date: Jun. 3, 2011

(65) Prior Publication Data
US 2012/0231374 A1    Sep. 13, 2012

(30) Foreign Application Priority Data
Dec. 25, 2009   (JP) ................................. 2009-293878

(51) Int. Cl.
*H01M 8/02* (2006.01)
*C23C 16/26* (2006.01)
*C01B 31/02* (2006.01)
*B82Y 30/00* (2011.01)

(52) U.S. Cl.
CPC .............. *C01B 31/02* (2013.01); *H01M 8/0234* (2013.01); *H01M 8/021* (2013.01); *H01M 8/0228* (2013.01); *B82Y 30/00* (2013.01); *Y02E 60/50* (2013.01)
USPC ............ 429/521; 429/522; 427/115; 427/577

(58) Field of Classification Search
None
See application file for complete search history.

(56) References Cited

U.S. PATENT DOCUMENTS 8,119,242 B2 *   2/2012   Iseki et al. ..................... 428/408
2009/0169968 A1 *   7/2009   Iseki et al. ..................... 429/34

FOREIGN PATENT DOCUMENTS

JP   10-228914 A   8/1998
JP   2000-067881 A   3/2000

(Continued)

OTHER PUBLICATIONS

International Search Report of PCT/JP2010/007528 mailed Apr. 5, 2011.

(Continued)

*Primary Examiner* — Jonathan Crepeau
(74) *Attorney, Agent, or Firm* — Kenyon & Kenyon LLP

(57) ABSTRACT

A bipolar plate for a fuel cell comprises a substrate formed of stainless steel; an oriented amorphous carbon film formed at least on a surface of the substrate facing an electrode, and containing C as a main component, 3 to 20 at. % of N, and more than 0 at. % and not more than 20 at. % of H, and when the total amount of the C is taken as 100 at. %, the amount of C having an $sp^2$ hybrid orbital ($Csp^2$) being not less than 70 at. % and less than 100 at. %, and (002) planes of graphite being oriented along a thickness direction; a mixed layer generated in an interface between the substrate and the oriented amorphous carbon film and containing at least one kind of constituent atoms of each of the substrate and the oriented amorphous carbon film; and a plurality of projections protruding from the mixed layer into the oriented amorphous carbon film and having a mean length of 10 to 150 nm.

9 Claims, 9 Drawing Sheets

(56) References Cited

FOREIGN PATENT DOCUMENTS

| | | |
|---|---|---|
| JP | 2001-032056 A | 2/2001 |
| JP | 2005-093172 A | 4/2005 |
| JP | 2008-004540 A | 1/2008 |

OTHER PUBLICATIONS

Extracted translation of Written Opinion of the International Searching Authority of PCT/JP2010/007528.

* cited by examiner

BIPOLAR PLATE FOR FUEL CELL AND METHOD FOR PRODUCING THE SAME

This is a 371 national phase application of PCT/JP2010/007528 filed 24 Dec. 2010, claiming priority to Japanese Patent Application No. 2009-293878 filed 25 Dec. 2009, the contents of which are incorporated herein by reference.

FIELD OF THE INVENTION

The present invention relates to a fuel cell bipolar plate mainly used for a polymer electrolyte fuel cell.

BACKGROUND OF THE INVENTION

A fuel cell simultaneously generates electricity and heat by an electrochemical reaction of hydrogen-containing fuel gas, and oxygen gas such as the air containing oxygen. An example of a single cell of a polymer electrolyte fuel cell is schematically shown in FIG. 13. The left diagram of FIG. 13 shows arrangement of its respective constituent elements before being laminated and the right diagram of FIG. 13 shows a laminated state of these elements. A single cell 1 is constituted by an electrolyte membrane 1a, and a pair of electrodes (an air electrode 1b and a fuel electrode 1c) sandwiching the electrolyte membrane 1a from both sides. Bipolar plates 2 have channel-formed surfaces 2b, 2c on which a plurality of channels are formed. The bipolar plates 2 are housed in resin bipolar plate frames 3 and laminated so that the air electrode 1b and the channel-formed surface 2b face each other and the fuel electrode 1c and the channel-formed surface 2c face each other. Thus, gas flow passages sectioned by electrode surfaces and the channels are formed between the electrodes and the bipolar plates, and efficiently supply fuel gas and oxygen gas, which are reaction gases of the fuel cell, to the electrode surfaces.

In the fuel cell, fuel gas and oxygen gas need to be separately supplied to the entire electrode surfaces without being mixed with each other. Therefore, the bipolar plates need to be gas tight. Furthermore, the bipolar plates need to have a good electric conductivity in order to collect electrons generated by reaction and serve as electric connectors for connecting adjoining single cells when a plurality of single cells are stacked. Moreover, because polymer electrolyte membrane surfaces are strongly acidic, the bipolar plates are demanded to have corrosion resistance.

Therefore, as a bipolar plate material, it is common to use graphite plates. However, since the graphite plates break easily, the graphite plates have a problem with workability in producing bipolar plates by forming a plurality of gas passages thereon, flattening the surfaces and so on. On the other hand, because metallic materials have good workability as well as good electric conductivity and especially titanium and stainless steel have good corrosion resistance, the metallic materials can be used as bipolar plate materials. However, since metallic materials having good corrosion resistance are easily passivated, the metallic materials have a problem of increasing internal resistance of a fuel cell and causing a voltage drop.

PTL 1 discloses a fuel cell bipolar plate comprising a metal member and having gold directly plated on a surface to contact an electrode of a single cell. Because the surface to contact an electrode is plated with gold, contact resistance between the bipolar plate and the electrode decreases, electric conductivity improves and output voltage of the fuel cell increases. It is believed that if a bipolar plate is fully covered with an electrically conductive material such as corrosion-resistant gold plating, the metal member becomes resistant to corrosion and metal ions are prevented from being eluted away and the metal member exhibits low contact resistance. However, gold plating constitutes a major obstacle to practical use in view of costs and resources.

PTL 2 discloses stainless steel having high corrosion resistance and low electric contact resistance. Specifically, electrically conductive metallic inclusions are dispersed so as to break through a passivated film on a surface of stainless steel, thereby decreasing contact resistance of the stainless steel. However, even if a matrix is passivated, elution of chromium ions, iron ions and the like, which is a cause of degradation of an electrolyte membrane, is inevitable. Moreover, because the metallic inclusions also gradually corrode under potential-applied highly corrosive environments, it is anticipated that if these metallic inclusions are passivated by corrosion, output voltage decreases.

In order to solve such problems as above, attention is drawn to a fuel cell bipolar plate formed by coating a surface of a metal substrate with an electrically conductive amorphous carbon film.

For example, each of PTL 3 and PTL 4 discloses a bipolar plate formed by coating a metal plate with an electrically conductive amorphous carbon film. Upon coating the metal plate with the amorphous carbon film, the bipolar plate exhibits corrosion resistance. Particularly in PTL 4, an amorphous carbon film mainly comprising carbon and hydrogen is formed on a surface of a metal substrate by using ionized vapor deposition. PTL 4 states that film formation by ionized vapor deposition generates an intermediate layer in which an incident carbon film-forming molecule and atoms constituting a surface layer of the substrate are chemically bonded together.

By the way, PTL 5 secures electric conductivity of an amorphous carbon film by increasing the amount of carbon having an $sp^2$ hybrid orbital and decreasing the content of hydrogen. Depending on a difference in atomic orbital in chemical bonding, carbon atoms are classified into three kinds: carbon having an sp hybrid orbital (Csp), carbon having an $sp^2$ hybrid orbital ($Csp^2$) and carbon having an $sp^3$ hybrid orbital ($Csp^2$). For example, diamond, which consists only of $Csp^2$, forms only σ bonds and exhibits high electrical insulation due to localization of σ electrons. On the other hand, graphite consists only of $Csp^2$, forms σ bonds and π bonds, and exhibits high electric conductivity due to delocalization of π electrons. In the amorphous carbon film recited in PTL 5, delocalization of π electrons is promoted by a high ratio of $Csp^2$ in the entire carbon, and molecular termination by C—H bonds (σ bonds) is suppressed by a decrease in the hydrogen content. As a result, the amorphous carbon film recited in PTL 5 exhibits a high electric conductivity.

CITATION LIST

Patent Literature

[PTL 1] Japanese Unexamined Patent Publication No. H10-228914
[PTL 2] Japanese Unexamined Patent Publication No. 2001-32056
[PTL 3] Japanese Unexamined Patent Publication No. 2000-67881
[PTL 4] Japanese Unexamined Patent Publication No. 2005-93172
[PTL 5] Japanese Unexamined Patent Publication No. 2008-4540

SUMMARY OF INVENTION

Technical Problems

In general, characteristics of fuel cell bipolar plates should be evaluated under conditions which simulate practical use environments of fuel cells. That is to say, corrosion resistance of fuel cell bipolar plates cannot be regarded to be sufficient, unless a corrosion resistance evaluation test is performed under severe voltage-applied conditions. Since evaluation of characteristics was not carried out under such severe conditions in PTL 3 or PTL 4, it is believed that when used in a fuel cell, these bipolar plates do not exhibit required electric conductivity or corrosion resistance. Since such a corrosion resistance evaluation method as those recited in PTL 3 and PTL 4 is not performed under voltage application, even if an amorphous carbon film has pores, which may become a cause of corrosion, no ion transfer occurs. That is to say, the evaluation methods recited in PTL 3 and PTL 4 are not tests which simulate practical use environments of fuel cells.

Especially in the examples of PLT 4, an amorphous carbon film comprising hydrogen and carbon is directly formed on a stainless steel substrate. Stainless steel is a low-carbon iron-based alloy containing about not less than 12% by mass of chromium (Cr). Because stainless steel is stabilized by forming a stable passive film on a surface thereof, the stainless steel exhibits good corrosion resistance. An alloying element which has a great effect on formation of a passive film is Cr, and when the concentration of Cr in an alloy exceeds 12% by mass, the alloy sharply improves in corrosion resistance and hardly corrodes though depending on environments. However, when carbon diffuses from an amorphous carbon film into a stainless steel substrate, Cr, which is an additional element contained in stainless steel, is bonded with the diffused carbon to form carbides or the like. Therefore, low-Cr layers are formed around these reaction products. Since the concentration of Cr in regions surrounding the low-Cr layers is lower than that of the original stainless steel, the stainless steel substrate has a difficulty in forming a stable passive film and suffers from a problem that corrosion resistance locally decreases and a resultant bipolar plate is prone to corrosion.

In view of the foregoing problems, the present inventors aim to provide a fuel cell bipolar plate produced by forming an amorphous carbon film on a stainless steel substrate and exhibiting good electric conductivity and corrosion resistance even under conditions which simulate practical use conditions of fuel cells, and a method for producing the same.

Solution to Problems

As a result of their earnest studies, the present inventors have found that in the amorphous carbon film recited in PLT 5, a highly electrically conductive and fine amorphous carbon film can be obtained by orienting (002) planes of graphite within the film while keeping an amorphous structure. The present inventors have also found that a fuel cell bipolar plate having a characteristic cross-sectional structure can be obtained by forming such an amorphous carbon film on a surface of a stainless steel substrate under particular film-forming conditions. The present inventors have done further research based on these findings and completed a variety of inventions as follows.

That is to say, a bipolar plate for a fuel cell according to the present invention comprises:
a substrate formed of stainless steel;
an oriented amorphous carbon film formed at least on a surface of the substrate facing an electrode, and containing carbon (C) as a main component, 3 to 20 at. % of nitrogen (N), and more than 0 at. % and not more than 20 at. % of hydrogen (H), and when the total amount of the carbon is taken as 100 at. %, the amount of carbon having an $sp^2$ hybrid orbital being not less than 70 at. % and less than 100 at. % and (002) planes of graphite being oriented along a thickness direction;
a mixed layer generated in an interface between the substrate and the oriented amorphous carbon film and containing at least one kind of constituent atoms of each of the substrate and the oriented amorphous carbon film; and
a plurality of projections protruding from the mixed layer into the oriented amorphous carbon film and having a mean length of 10 to 150 nm.

In the oriented amorphous carbon film of the fuel cell bipolar plate of the present invention, not less than 70 at. % of the amount of C contained is carbon having an $sp^2$ hybrid orbital ($Csp^2$). Further, (002) planes of graphite are oriented along a thickness direction. That is to say, owing to a structure in which each ring structure continuously extends in a thickness direction and such ring structures are layered, the oriented amorphous carbon film exhibits a high electric conductivity mainly in the thickness direction. Besides, because of containing N and H, even though oriented, the oriented amorphous carbon film does not have a full crystal structure (graphite structure) but has an amorphous carbon structure having no long-distance order.

Moreover, because of having a high orientation, the oriented amorphous carbon film is a fine film having a high density and a high hardness. Therefore, the fuel cell bipolar plate of the present invention is highly reliable in terms of corrosion resistance, chemical resistance, oxygen barrier property, not to mention high mechanical properties.

Moreover, the fuel cell bipolar plate of the present invention comprises a mixed layer containing constituent atoms of each of the substrate and the oriented amorphous carbon film, and a plurality of projections. The presence of the mixed layer and the projections improves adhesion between the substrate and the oriented amorphous carbon film. This is because the mixed layer has a good affinity with both the substrate and the oriented amorphous carbon film. Especially the adhesion of the mixed layer and the oriented amorphous carbon film is assumed to be obtained by anchor effect, because the plurality of projections protrude from the mixed layer into the oriented amorphous carbon film. Therefore, even if a corrosive solution invades defects (pin holes) of the oriented amorphous carbon film, the amorphous carbon film is difficult to be peeled off.

By the way, since the mixed layer contains constituent atoms of each of the substrate and the oriented amorphous carbon film, it is anticipated that corrosion resistance of the substrate will decrease due to the abovementioned decrease in chromium (Cr). However, because the oriented amorphous carbon film is fine, even if Cr is taken into the mixed layer to form a compound, a decrease in corrosion resistance is suppressed. Moreover, since the nitrogen-containing mixed layer has an effect of increasing the concentration of ammonium ions in the vicinity of pin holes and thereby locally decreasing chloride ions, fluoride ions and the like, pitting corrosion is not likely to occur.

Moreover, according to a method for producing a bipolar plate for a fuel cell of the present invention, it is possible to easily form the bipolar plate for a fuel cell of the present invention comprising the abovementioned mixed layer and the plurality of projections.

That is to say, a method for producing a bipolar plate for a fuel cell according to the present invention is a method for producing the abovementioned fuel cell bipolar plate by DC plasma CVD method, comprising:

placing the substrate in a reaction vessel, introducing reaction gas comprising at least one compound gas selected from the group consisting of gases of carbocyclic compounds containing carbon having an $sp^2$ hybrid orbital and gases of N-containing heterocyclic compounds containing carbon having an $sp^2$ orbital and nitrogen, and nitrogen gas into the reaction vessel, and generating an electric discharge by applying a voltage of not less than 1500 V, thereby forming the film on the substrate having a temperature of 300 to 520 deg. C.

The abovementioned oriented amorphous carbon film can be easily formed by DC plasma CVD method using a particular combination of reaction gases and applying a high voltage. The reason is assumed as follows.

In general, when electrons collide against a hydrocarbon, a C—H bond is broken and the hydrocarbon is ionized. When gas of a hydrocarbon comprising $Csp^3$ such as methane is used, even if a C—H bond is broken, the hydrocarbon is easily taken into the film while keeping four-coordinated stereo structure. Therefore, it is believed that strong orientation is difficult to occur and an amorphous carbon film having a particular orientation cannot be formed. On the other hand, when a high voltage of not less than 1500 V is applied to gas of a compound having a ring structure such as benzene and pyridine, it is believed that when the compound is ionized, a strong polarizing action occurs within a plane, so positive charge and negative charge are generated in the plane. It is assumed that strongly polarized ions are attracted to a cathode side (a substrate side) by the high negative voltage and deposited while keeping its ring structure. FIG. 1 is a schematic view illustrating a mechanism for forming an oriented amorphous carbon film when pyridine gas is employed as the compound gas. Among compound gases, especially pyridine greatly polarizes upon application of a high voltage, because N carries a negative charge and remnant C carries a positive charge from the beginning. Therefore, it is assumed that if gas of a chemical compound containing N in a ring structure is employed as the compound gas, an amorphous carbon film is more easily oriented. Moreover, upon using nitrogen gas together with the above compound gas, H in a C—H bond of the compound gas is replaced with N. It is assumed that as a result of that, the hydrogen content of the oriented amorphous carbon decreases and polarization of the compound gas is promoted.

It should be noted that a "thickness direction" as used herein is a direction perpendicular to a surface of a substrate. It can also be said as a deposited direction of carbon and so on during film formation. Moreover, "oriented along a thickness direction" includes not only a case in which (002) planes of graphite of an oriented amorphous carbon film are parallel to a thickness direction of the film but also a case in which the (002) planes are slightly inclined with respect to the thickness direction. Depending on methods of forming a film, since a substrate is sometimes moved relative to a device, orientation of (002) planes is sometimes slightly inclined with respect to a perpendicular direction to the substrate.

Furthermore, a mixed layer and a plurality of projections are automatically formed by controlling the temperature of a stainless steel substrate in a particular range while forming an oriented amorphous carbon film on the substrate. That is to say, the fuel cell bipolar plate of the present invention is produced without forming a mixed layer, a plurality of projections and an oriented amorphous carbon film on a surface of a substrate in separate steps. Only with a single step of forming an oriented amorphous carbon film on a stainless steel substrate under particular film-forming conditions, a mixed layer and a plurality of projections are generated in an interface between the substrate and the oriented amorphous carbon film.

Advantageous Effects of Invention

The bipolar plate for a fuel cell according to the present invention exhibits good electric conductivity and corrosion resistance even used under severe corrosive environments. This fuel cell bipolar plate can be easily produced by the method for producing a fuel cell bipolar plate of the present invention.

DETAILED DESCRIPTION

Figure 1:
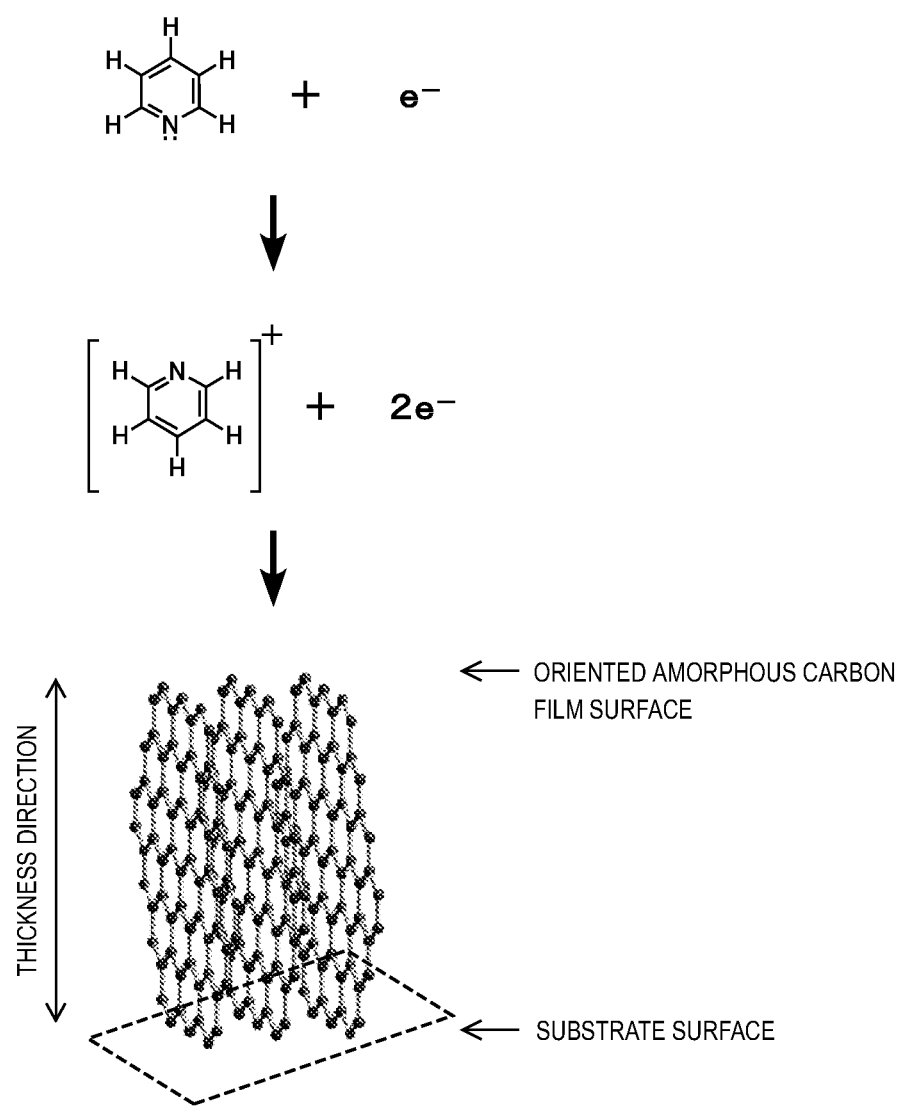
FIG. 1 is a schematic diagram illustrating a mechanism for forming an oriented amorphous carbon film.

Hereinafter, best modes for carrying out the fuel cell bipolar plate and the method for producing the same according to the present invention will be described. It should be noted that a numerical range "x to y" as recited herein includes both a lower limit x and an upper limit y, unless otherwise specified. Besides, within such a numerical range, a new numerical range can be constituted by arbitrarily combining numerical values recited herein.

Generally, a fuel cell bipolar plate with an amorphous carbon film comprises a metal substrate and an amorphous carbon film covering at least a surface of the substrate facing an electrode. A fuel cell bipolar plate usually has a surface which partially contacts an electrode deposited on a solid electrolyte, and forms gas flow passages with the electrode by partitioning space therebetween. Since the amorphous carbon film covers the surface of the metal substrate, electric conductivity and corrosion resistance required for a fuel cell bipolar plate can be exhibited.

A fuel cell bipolar plate of the present invention described in detail hereinafter can be applied to a general fuel cell. It should be noted that a general fuel cell has single cells each constituted by a polymer electrolyte and a pair of electrodes sandwiching the polymer electrolyte from both sides. Each of the electrodes comprises a catalyst layer containing carbon powder loaded with a metal catalyst as a main component and formed on a surface of the polymer electrolyte membrane, and a gas diffusion layer located on an outer surface of the catalyst layer and having gas permeability and electric conductivity. The carbon powder constituting the catalyst layer is loaded with a catalyst such as platinum, nickel and palladium. Generally used as the gas diffusion layer is carbon fiber woven cloth (carbon cloth) or carbon fiber nonwoven cloth (carbon paper).

<<Fuel Cell Bipolar Plate>>

The bipolar plate for a fuel cell according to the present invention comprises a substrate, an oriented amorphous carbon film, a mixed layer and a plurality of projections. Hereinafter, the respective constituent components will be described in detail.

<Substrate>

The substrate is formed of stainless steel. As described before, stainless steel is a low-carbon iron-based alloy containing not less than 12% by mass of chromium (Cr). That is to say, the substrate mainly contains iron (Fe) and Cr. The substrate may further contain nickel (Ni), molybdenum (Mo), copper (Cu), silicon (Si) and so on. In a case of Cr—Ni stainless steel, preferably the stainless steel contains 14 to 40% by mass of Cr and 0.1 to 16% by mass of Ni. Moreover, the structure of stainless steel is not particularly limited and can be selected from martensite stainless steel, ferrite stainless steel, austenite stainless steel and duplex stainless steel. According to JIS standards, SUS 430, SUS 447J1, SUS 304, SUS 303, SUS 316, SUS 316L, SUS 440C and the like are applicable. Shape of the substrate can be arbitrarily selected in accordance with specifications of a fuel cell.

<Oriented Amorphous Carbon Film>

The oriented amorphous carbon film is formed at least on a surface of the substrate facing an electrode. The oriented amorphous carbon film contains carbon (C) as a main component, and 3 to 20 at. % of nitrogen (N), more than 0 at. % and not more than 20 at. % of hydrogen (H), and when the total amount of the carbon is taken as 100 at. %, the amount of carbon having an $sp^2$ hybrid orbital (the amount of $Csp^2$) is not less than 70 at. % and less than 100 at. %.

Figure 2:
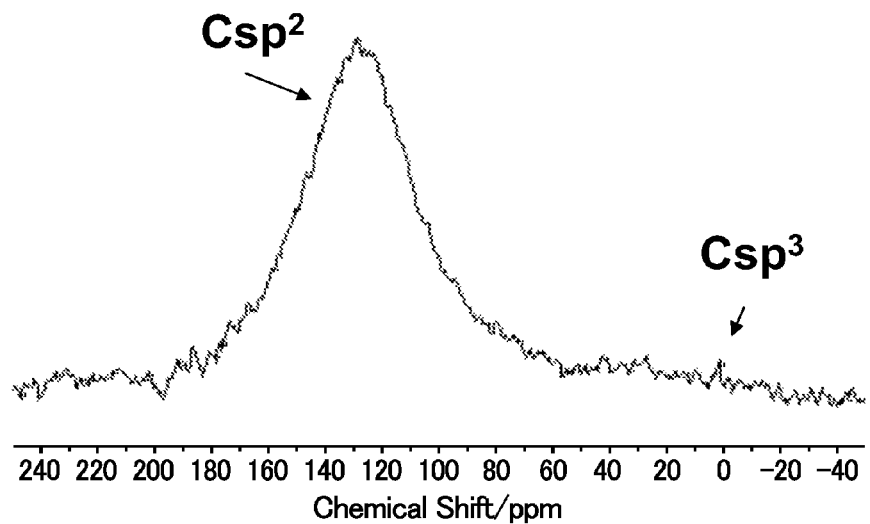
FIG. 2 is an example of a $^{13}C$ NMR spectrum of an amorphous carbon film.

Employed herein as a method for determining the amount of $Csp^2$ and $Csp^3$ is a nuclear magnetic resonance (NMR) method, which exhibits the highest abilities to measure quantitative characteristics in determining the structure of a lot of organic and inorganic materials. The amount of $Csp^2$ or $Csp^3$ was measured using high-power decoupling with magic angle spinning (HD-MAS), which has a quantitative-characteristic measurability in solid-state NMR. FIG. 2 shows an example of a $^{13}C$ NMR spectrum of an amorphous carbon film. As shown in FIG. 2, peaks attributed to $Csp^2$ and $Csp^3$ are observed around 130 ppm and 30 ppm, respectively. Ratio of the amount of $Csp^2$ and the amount of $Csp^3$ contained in the total amount of carbon was calculated from a ratio in areas of portions surrounded by the respective peaks and a baseline.

The amount of $Csp^2$ of the oriented amorphous carbon film thus calculated is not less than 70 at. % and less than 100 at. % when the total amount of carbon is taken as 100 at. %. When the amount of $Csp^2$ is not less than 70 at. %, delocalization of π electrons is promoted and high electric conductivity is exhibited. However, when the amount of $Csp^2$ is 100 at. %, electric conductivity is obtained but amorphous carbon becomes powdery and it is difficult to obtain an oriented amorphous carbon film. It is preferable that the amount of $Csp^2$ of the oriented amorphous carbon film is not less than 80 at. %, not less than 90 at. %, not less than 92 at. % or not less than 94 at. %, while not more than 99.5 at. % or not more than 99 at. %. It should be noted that carbon constituting the oriented amorphous carbon film is believed to be two kinds: $Csp^2$ and $Csp^3$. Therefore, the amount of $Csp^3$ of the oriented amorphous carbon film is not more than 30 at. % (excluding 0 at. %), when the total amount of carbon is taken as 100 at. %.

The oriented amorphous carbon film contains 3 to 20 at. % of nitrogen (N). In the amorphous carbon film containing not less than 3 at. % of nitrogen and formed by the film-forming method mentioned later, (002) planes of graphite are oriented in a thickness direction thereof. Moreover, since nitrogen atoms serve as n-type donors in the oriented amorphous carbon film and effectively excite electrons trapped in the donor level to the conduction band, electric conductivity of the oriented amorphous carbon film is further increased. Preferably the N content is not less than 5 at. % or not less than 7 at. %. However, since a large N content promotes molecular termination due to formation of C=N bonds, the N content is suppressed to not more than 20 at. %. Preferably the N content of the oriented amorphous carbon film is not less than 11 at. % or not less than 11.5 at. % while not more than 17 at. %, not more than 15 at. % or not more than 13.5 at. %.

The hydrogen (H) content of the oriented amorphous carbon film is more than 0 at. % and not more than 20 at. %. Since molecular termination by C—H bonds (σ bonds) is suppressed by reducing the H content, π electrons increase and a high electric conductivity is exhibited. Therefore, as the oriented amorphous carbon film has a smaller H content, effect of improving electric conductivity is greater. Accordingly, it is preferable that the H content is not more than 19 at. % or not more than 18 at. %. Moreover, electric conductivity increases with a decrease in the H content, but if the H content has to be defined, the H content can be not less than 5 at. %, not less than 8 at. %, not less than 10 at. %, or not less than 12 at. %.

The oriented amorphous carbon film can further contain silicon. Not more than 1 at. % of silicon (Si) in the oriented amorphous carbon film has little effect on orientation or electric conductivity of the oriented amorphous carbon film, increases density of the oriented amorphous carbon film and improves adhesion between the oriented amorphous carbon film and the substrate. Preferably the Si content of the oriented amorphous carbon film is not less than 0.5 at. % or not less than 0.75 at. %, while less than 1 at. %.

As mentioned above, the oriented amorphous carbon film comprises hydrogen, nitrogen, and if necessary, silicon, with the remainder being carbon and inevitable impurities, and it is desirable that the oriented amorphous carbon film substantially does not contain other elements. However, when the entire amorphous carbon film is taken as 100 at. %, the amorphous carbon film can further contain not more than 3 at. % of oxygen (O). If the oxygen content, which results from oxygen gas mixed during formation of the oriented amorphous carbon film, is controlled to not more than 3 at. %, formation of oxides such as silicon oxide can be suppressed, so oxygen inclusion is permitted. Preferably the O content is not more than 2 at. % or not more than 1 at. %.

Moreover, in the oriented amorphous carbon film, (002) planes of graphite are oriented along a thickness direction thereof. It can be confirmed by X-ray diffraction measurement mentioned below that (002) planes of graphite are oriented along a thickness direction of the oriented amorphous carbon film. Hereinafter, in-plane diffraction measurement method will be described.

Figure 3:
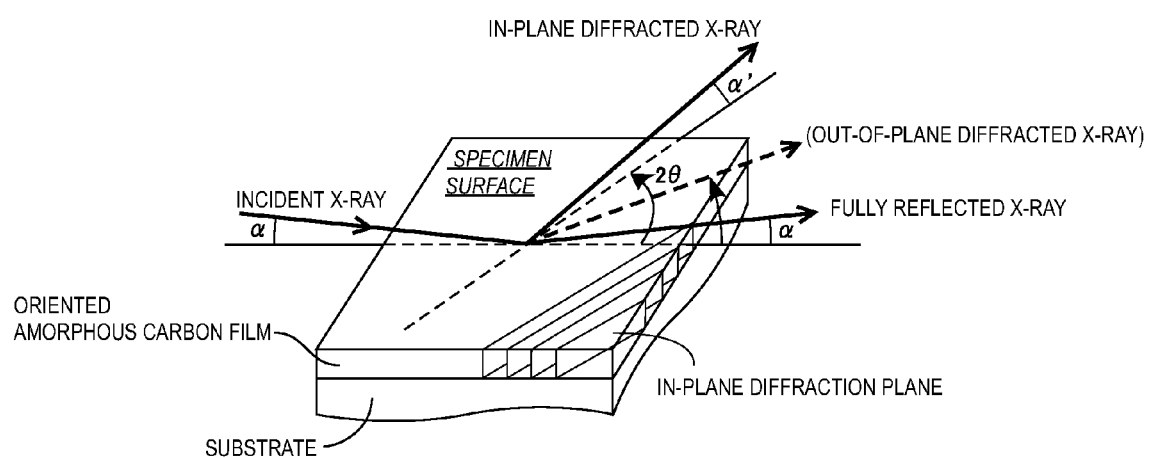
FIG. 3 is a schematic diagram illustrating a method for measuring in-plane X-ray diffraction (scattering) in order to confirm orientation of an oriented amorphous carbon film.

Depending on geometrical arrangement of the direction of lattice planes to be measured, X-ray diffraction method is roughly classified into two kinds: out-of-plane diffraction measurement and in-plane diffraction measurement. The out-of-plane diffraction measurement method is 2θ scanning with an incident X-ray beam angle fixed, and crystal planes to be observed are parallel to a specimen surface. On the other hand, the in-plane diffraction measurement method is performed by precisely controlling an incident X-ray beam angle to be nearly in parallel to a specimen surface. With reference to FIG. 3, an incident angle α is typically 0.5 deg. or less and when the incident X-ray beam has an energy of 12 keV, the incident angle α is 0.1 deg. or less. A detector for an in-plane diffracted X-ray beam measures the intensity of a diffracted X-ray beam not in such a manner to rise up with respect to a specimen surface like in a θ-2θ method for measuring an out-of-plane diffracted X-ray beam but in such a manner to slide on a specimen surface while forming a slight angle therewith. That is to say, a visual angle α' to a beam radiating portion viewed from a specimen surface is kept constant. Crystal planes contributing to in-plane diffraction (diffraction planes) are planes perpendicular to the specimen surface.

When (002) planes of graphite are oriented along a thickness direction of a film, a peak corresponding to (002) planes is remarkably shown in an in-plane diffraction spectrum. For example, a peak around 2θ=17 deg. is shown stronger than a peak around 2θ=29 deg. (see FIG. 8B). The peak around 2θ=17 deg. corresponds to (002) planes of graphite and the peak around 2θ=29 deg. corresponds to (100) planes of graphite. Orientation can be expressed more specifically in terms of numerical values by using an orientation index. In the description of the present invention, an orientation index D, orientation indexes r, r' described below are employed as orientation indexes.

$$D = (I_{002}/I_{100})/(I_{002}'/I_{100}')$$

where $I_{002}$, $I_{100}$, $I_{002}'$, and $I_{100}'$ are respectively intensity of peaks obtained by measuring X-ray diffraction of an amorphous carbon film. $I_{002}$ is intensity of an in-plane diffraction peak from (002) planes, $I_{100}$ is intensity of an in-plane diffraction peak from (100) planes, $I_{002}'$ is intensity of an out-of-plane diffraction peak from (002) planes, and $I_{100}'$ is intensity of an out-of-plane diffraction peak from (100) planes. Each of them is a maximum intensity around an angle (2θ) at which a diffraction peak from (002) planes or (100) planes is observed. Preferably the orientation index D of an oriented amorphous carbon film is not less than 9, not less than 10, not less than 20, not less than 30, not less than 50, or not less than 500. Although not particularly defined, an upper limit value of the orientation index D is preferably not more than 1000 or not more than 800.

If the orientation index is to be defined more precisely, powder X-ray diffraction simulation of 2H graphite (hexagonal graphite) may be performed on structural parameters from (002) plane orientation through random orientation to (100) plane orientation, to obtain a relation between a diffraction pattern (i.e., intensity of peaks) and the structural parameters, and an orientation index r corresponding to the above "$I_{002}/I_{100}$" and an orientation index r' corresponding to the above "$I_{002}'/I_{100}'$" can be calculated from the relation between the diffraction pattern and the structural parameters. The powder X-ray diffraction simulation can be performed by using a common Rietveld refinement software. In this case, of various structural parameters, a structural parameter corresponding to an orientation index is a preferred orientation parameter, which is 1 at random orientation. Method for calculating an orientation index will be described in detail in the section of examples, but it is preferable that the orientation index r of the oriented amorphous carbon film is 0.9 to 1.6 or 1 to 1.5, and the orientation index r' of the oriented amorphous carbon film is not less than 2, not less than 3.5, or not less than 4.5. Although not particularly defined, an upper limit value of the orientation index r' is preferably not more than 10 or not more than 7.

For the above peak intensity, it is necessary to obtain a value by subtracting background from an X-ray diffraction spectrum. The subtraction of the background can be performed by using a commercially available software or the method described in detail in the section of the examples.

It should be noted that the oriented amorphous carbon film is an amorphous carbon film containing carbon as a main component. This is because degree of crystallinity is decreased by containing predetermined amounts of nitrogen and hydrogen in addition to carbon. The fact that the oriented amorphous carbon film is amorphous can be confirmed by pulverizing the oriented amorphous carbon film into powder and performing X-ray diffraction measurement on the powder. According to X-ray diffraction measurement, sharp diffraction peaks indicating presence of crystal are not detected and a diffraction peak corresponding to (002) planes of graphite shows a broad halo pattern. When the entire oriented amorphous carbon film is subjected to electron diffraction, a similar result is obtained.

In this case, it is preferable that mean interplanar spacing between (002) planes calculated from Bragg's Law is 0.34 to 0.50 nm. When the mean interplanar spacing between (002) planes is not more than 0.50 nm, owing to the small interplanar spacing, π electron interaction between the planes is increased and electric conductivity is improved. It should be noted that mean interplanar spacing between (002) planes of graphite is 0.34 nm.

It should be noted that "having electric conductivity" as used herein means to exhibit a volume resistivity of not more than $10^2$ ohm cm. Electric conductivity of the amorphous carbon film is not particularly limited, but it is preferable that volume resistivity is not more than $10^2$ ohm cm, not more than $10^1$ ohm cm, not more than $5 \times 10^{-1}$ ohm cm, not more than $10^{-1}$ ohm cm, or not more than $10^{-2}$ ohm cm. It should also be noted that the volume resistivity of the oriented amorphous carbon film as used herein is defined as a value obtained by measuring volume resistivity of a film surface by four probe method. In the oriented amorphous carbon film, (002) planes of graphite are oriented along a thickness direction. Therefore, it is estimated that electric resistance measured by applying an electric current in a thickness direction of the oriented amorphous carbon film is even lower. For example, highly oriented pyrolytic graphite (HOPG) has a volume resistivity of about $10^{-1}$ ohm cm in an interlayer direction and about $10^{-3}$ ohm cm in a layer-extending direction.

It should be noted that fineness of the oriented amorphous carbon film as used herein is evaluated by measuring density of the film. Measurement of density can be conducted by commonly used measurement methods, and specific procedure will be described in detail in the section of the examples. The oriented amorphous carbon film of the present invention has a density of not less than 1.6 g/cm$^3$, not less than 1.8 g/cm$^3$ or not less than 2.0 g/cm$^3$. If an upper limit of film density is to be defined, not more than 3 g/cm$^3$ or not more than 2.4 g/cm$^3$ is preferred.

Film thickness of the oriented amorphous carbon film is not particularly limited, but not less than 5 nm, not less than 10 nm, not less than 50 nm or not less than 100 nm is preferred. A greater film thickness is more advantageous in terms of corrosion resistance, but since the oriented amorphous carbon film is dense, possibility of peeling off or cracking increases with a greater film thickness. Therefore, it is preferable that the film thickness is not more than 1000 nm, not more than 750 nm, or not more than 600 nm. It should be noted that film thickness of the oriented amorphous carbon film is a film thickness from a surface of the mixed layer to a surface of the oriented amorphous carbon film and a mean value of values obtained by measuring a plurality of portions on a micrograph showing a cross section of an oriented amorphous carbon film.

Mixed Layer

The mixed layer is generated in an interface between the substrate and the oriented amorphous carbon film. Therefore, the mixed layer contains at least one kind of constituent atoms of each of the substrate and the oriented amorphous carbon film. The mixed layer can have a diffusion layer in which at least C and N are diffused into a surface layer of the substrate. Moreover, the mixed layer can have a compound layer containing at least one kind of compound selected from compounds comprising combinations of at least one kind of atoms selected from constituent atoms of the substrate, and at least one kind of atoms selected from constituent atoms of the oriented amorphous carbon film and oxygen atoms. Hereinafter, the mixed layer will be described with reference to FIG. 4.

Figure 4:
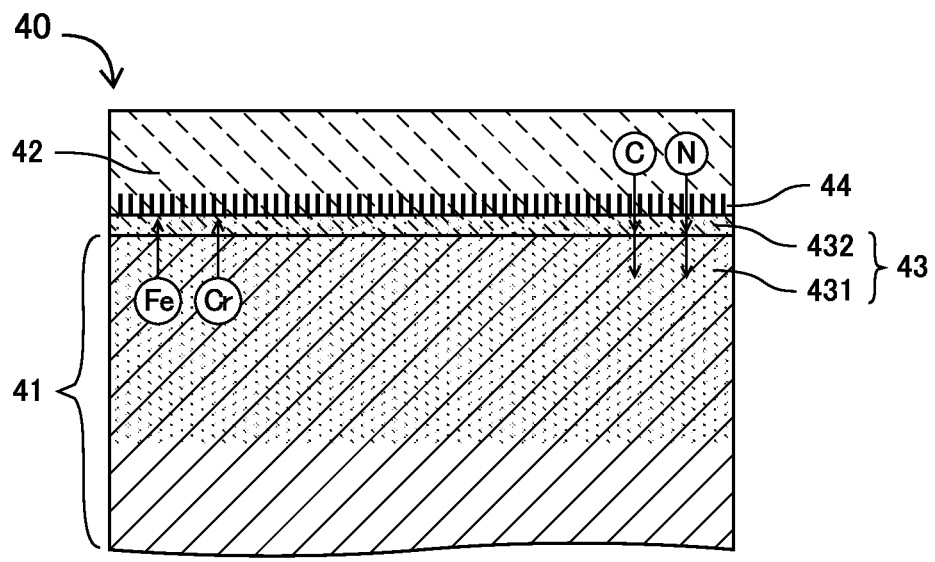
FIG. 4 is a cross sectional view schematically showing construction of the fuel cell bipolar plate of the present invention.

FIG. 4 is a cross sectional view schematically showing part of the fuel cell bipolar plate of the present invention. It should be noted that the fuel cell bipolar plate shown in FIG. 4 is just an example of the present invention and construction of the present invention is not limited to this one. A bipolar plate 40 for a fuel cell comprises a stainless steel substrate 41 and an oriented amorphous carbon film 42 formed on a surface of the substrate 41. A mixed layer 43 is generated in an interface between the substrate 41 and the oriented amorphous carbon film 42, and a plurality of projections 44, which will be mentioned later, protrudes from the mixed layer 43 into the oriented amorphous carbon film 42. The mixed layer 43 is generated by transfer of constituent atoms of the substrate 41 into the oriented amorphous carbon film 42 side and transfer of constituent atoms of the oriented amorphous carbon film 42 into the substrate 41 side so as to be diffused into the substrate or be bonded with each other. For example, since the oriented amorphous carbon film 42 mainly contains C and N, atoms of these elements diffuse into the substrate 41 and form a diffusion layer 431. On the other hand, since the substrate mainly contains Fe and Cr, at least one kind of atoms of these elements are bonded with at least one kind of atoms selected from constituent atoms of the oriented amorphous carbon film 42 and oxygen atoms to form a compound. Generation of this mixed layer occurs during formation of the oriented amorphous carbon film. It should be noted that since little oxygen is contained in the oriented amorphous carbon film but oxygen is contained in a film-forming atmosphere, and therefore oxygen is sometimes taken into the film during film formation to form oxides.

That is to say, cross-sectional structure of the fuel cell bipolar plate is constituted by a continuous laminated body of the substrate (the diffusion layer)/the compound layer/the projections/the oriented amorphous carbon film which are deposited in this order. Thickness of the mixed layer is not particularly limited. However, since excessive generation of the compound layer reduces the Cr amount in the substrate and accordingly decreases its corrosion resistance, it is preferable that the film thickness is not more than 1000 nm, not more than 500 nm, not more than 200 nm, or not more than 150 nm. A lower limit of film thickness of the compound layer is not particularly limited, but it has been found out that if the compound layer is not formed, the projections, which will be mentioned later, are difficult to grow. Therefore, the film thickness is preferably not less than 0.5 nm, not less than 2.5 nm or not less than 4 nm. Moreover, if thickness of the diffusion layer (diffusion distance from a surface of the substrate) is to be defined, not less than 10 nm and not more than 20 μm, 0.1 to 10 μm or 0.5 to 4 μm is preferred. Thickness of the compound layer and the diffusion layer is a mean value of values obtained by measuring a plurality of portions on a micrograph showing a cross section of a surface portion of a bipolar plate for a fuel cell. For example, with a transmission electron microscope (TEM), two layers having different shades of gray are confirmed on a substrate side. Thickness of the compound layer can be easily determined from a TEM image. Thickness of the diffusion layer can be obtained by measuring a region where carbon concentration measured by electron probe micro-analysis (EPMA) exceeds carbon concentration of a matrix of the substrate. That is to say, if the amount of carbon contained in a stainless steel substrate is 1 at. %, a region where carbon concentration measured by EPMA exceeds 1 at. % is a diffusion layer.

It is preferable that the compound layer contains at least one kind of compound selected from compounds comprising combinations of Fe and/or Cr, and at least one of C, N and O. That is to say, examples of a compound contained in the compound layer include chromium carbide, iron carbide, chromium carbonitride, iron carbonitride, and iron oxide, and the compound layer contains at least one kind of these compounds. However, when another alloying element such as Ni is contained in stainless steel or another additional element such as Si is contained in the oriented amorphous carbon film, a compound containing such an element is sometimes contained in the compound layer. Besides, it is preferable that the diffusion layer is a layer in which C and N are contained in a total amount of not less than 0.01 at. % or not less than 0.1 at. % in a matrix of a stainless steel substrate. As mentioned before, if C is diffused into stainless steel, corrosion resistance decreases, generally. However, in the fuel cell bipolar plate of the present invention, it is assumed that the decrease in corrosion resistance is suppressed by diffusing not only C but N in combination with C into stainless steel. This mechanism is not clear, but it is assumed to be because even if a corrosive solution invades pinholes of the oriented amorphous carbon film, the concentration of ammonium ions in the vicinity of the pin holes increases and the concentration of chloride ions, fluoride ions and so on, which are causes of pitting corrosion, are locally reduced. Therefore, even if the oriented amorphous carbon film is directly formed on a surface of the stainless steel substrate, corrosion resistance of the substrate is kept high.

Elements contained in the compound layer and the diffusion layer can be confirmed, for example, by electron probe micro-analysis (EPMA), X-ray photoelectron spectroscopy (XPS), Auger electron spectroscopy (AES), Rutherford backscattering spectroscopy (RBS), or energy dispersive X-ray analysis (EDX). Composition of the abovementioned oriented amorphous carbon film can be similarly confirmed. Identification of compounds can be conducted by X-ray diffraction, electron diffraction and so on.

A Plurality of Projections

The plurality of projections protrude from the mixed layer into the oriented amorphous carbon film. Mechanism of growth of the projections is not clear, but it is assumed that constituent atoms of the substrate invade and are bonded with the oriented amorphous carbon film in priority of portions into which these atoms can relatively easily diffuse. This is because the oriented amorphous carbon film is oriented along a thickness direction, and due to amorphous state, distance between constituent atoms is not constant. Because of protrusion from the mixed layer, it is believed that the plurality of projections have a similar composition to that of the mixed layer (or the compound layer).

The plurality of projections have a mean length of 10 to 150 nm. With a mean length of less than 10 nm, the oriented amorphous carbon film tends to be peeled off. Longer projections are preferred in view of adhesion but as the projections are longer, the compound layer tends to be thicker. Therefore, when the mean length of the projections exceeds 150 nm, the compound layer also has a greater layer thickness and the amount of Cr in the substrate decreases and corrosion resistance greatly decreases. Preferred mean length of the projections is 15 to 70 nm or 20 to 55 nm. However, it is predicted that if the projections protrude into the vicinity of a surface of the oriented amorphous carbon film or even out of the oriented amorphous carbon film, corrosion tends to proceed from the projections. Therefore, length of the projections can be defined with respect to thickness of the oriented amorphous carbon film. Ratio (T/L) of thickness (T) of the oriented amorphous carbon film to a mean length (L) of the plurality of projections is preferably 1 to 30, 1.5 to 20, 2 to 17, or 5.5 to 11. Moreover, width of each projection is not particularly limited, but mean width is preferably 5 to 30 nm or 10 to 25 nm. It should be noted that means length and mean width of the projections are respectively mean values obtained by measuring a plurality of portions on a micrograph showing a cross section of a bipolar plate for a fuel cell.

The fuel cell bipolar plate of the present invention as described above can be easily produced by performing only a single step of forming an oriented amorphous carbon film on a substrate by a method for producing a fuel cell bipolar plate, which will be described below.

Method for Producing a Fuel Cell Bipolar Plate

The fuel cell bipolar plate of the present invention as mentioned above can be produced by DC plasma CVD method. Employment of direct current system in forming an oriented amorphous carbon film enables formation of a highly oriented amorphous carbon film. Besides, the DC plasma CVD method has an advantage of obtaining a stable electric discharge even at a high reaction gas concentration and a high film-forming pressure of not less than 100 Pa.

When the fuel cell bipolar plate of the present invention is produced by DC plasma CVD method, first a substrate is placed in a vacuum vessel and a reaction gas (and a carrier gas, if necessary) is introduced. Next, plasma is generated by an electric discharge and plasma carbon and so on can be deposited on the substrate. However, in order to form an amorphous carbon film having a high ratio of $Csp^2$ in the entire carbon and having a particular orientation like the abovementioned oriented amorphous carbon film, it is necessary to select and use a particular kind of reaction gas, which will be mentioned in detail later. Moreover, in order to generate a mixed layer and a plurality of projections in an interface between the substrate and the oriented amorphous carbon film, it is necessary to form an oriented carbon film at a particular electric discharge voltage and a particular film-forming temperature.

That is to say, the method for producing the fuel cell bipolar plate according to the present invention comprises placing the substrate in a reaction vessel, introducing a particular reaction gas into the reaction vessel, and generating an electric discharge by applying a particular discharge voltage to the reaction gas, thereby forming an oriented amorphous carbon film on the substrate having a particular temperature.

In the method for producing the fuel cell bipolar plate according to the present invention, the mixed layer and the plurality of projections as mentioned before are generated during formation of the oriented amorphous carbon film. Therefore, there is no need to apply pretreatment such as nitriding to the substrate. However, in view of further improving adhesion between the oriented amorphous carbon film and the substrate, treatment for forming concavities and convexities by ion bombardment can be applied to a surface of the substrate beforehand. Specifically speaking, first a substrate is placed in a reaction vessel and gas in the reaction vessel is evacuated to a predetermined gas pressure. Next, a noble gas for forming concavities and convexities is introduced into the reaction vessel. Then, ion bombardment is carried out by glow discharge or ion beam, thereby forming concavities and convexities on the surface of the substrate.

Employed as the reaction gas is a reaction gas containing the compound gas described in detail below and nitrogen gas. As the nitrogen gas, it is possible to employ commercially available high purity nitrogen gas, high quality nitrogen gas and so on (for example, purity: 99% or more).

Employed as the compound gas is at least one compound gas selected from the group consisting of gases of carbocyclic compounds containing carbon having an $sp^2$ hybrid orbital, and gases of N-containing heterocyclic compounds containing carbon having an $sp^2$ hybrid orbital and nitrogen. It should be noted that a "carbocyclic compound" is a cyclic compound in which all atoms constituting a ring are carbon atoms. In contrast, a "heterocyclic compound" is a cyclic compound in which a ring is constituted by two or more kinds of atoms. Examples of carbocyclic compounds containing $Csp^2$, in other words, carbocyclic compounds having a carbon-carbon double bond include not only aromatic hydrocarbons such as benzene, toluene, xylene, and naphthalene, but also cyclohexene. It is also possible to use a carbocyclic compound containing nitrogen together with $Csp^2$, and examples of such a compound include N-containing aromatic compounds such as aniline and azobenzene. Examples of heterocyclic compounds include N-containing heterocyclic compounds such as pyridine, pyrazine, pyrrole, imidazole and pyrazole, in which a ring is constituted by carbon and nitrogen. Depending on composition of the oriented amorphous carbon film, it is possible to use a single kind of gas or a gas mixture of two or more kinds of gases of the carbocyclic compound gases and the heterocyclic compound gases. Pyridine is especially preferred as the compound gas in view of orientation.

When a silicon-containing oriented amorphous carbon film is to be formed, it is also possible to employ, as the compound gas, gas of a carbocyclic compound containing $Csp^2$ and Si, such as phenylsilane and phenylmethylsilane, and/or gas of a silicon-containing heterocyclic compound containing $Csp^2$ and Si. Moreover, the reaction gas can further contain a saturated organic silicon compound gas. Examples of the gas include $Si(CH_3)_4$ [TMS], $Si(CH_3)_3H$, $Si(CH_3)_2H_2$, $Si(CH_3)H_3$, $SiH_4$, $SiCl_4$, and $SiH_2F_4$. TMS is particularly preferred because it is chemically stable in the air and easy to handle.

Flow rate of the reaction gas is not particularly limited, as long as the abovementioned compound gas and nitrogen gas are employed together. However, an oriented amorphous carbon film having high orientation and a high nitrogen content can be easily obtained by controlling the nitrogen gas flow rate to not less than the compound gas flow rate.

Moreover, a carrier gas can be introduced together with the reaction gas. When a carrier gas is used, a film-forming atmosphere is constituted by the reaction gas and the carrier gas. Usable as the carrier gas is argon gas, helium gas or the like. It should be noted that in forming a conventional amorphous carbon film, hydrogen gas is sometimes employed as a carrier gas. However, in forming an oriented amorphous carbon film having a hydrogen content of not more than 20 at. %, film formation without using hydrogen gas is preferred. Preferably flow rate of the carrier gas is suppressed to not more than the reaction gas flow rate. If desired flow rate of the reaction gas and that of the carrier gas are to be specifically defined, it is preferable that the flow rate of the carrier gas is 0 to 1200 sccm (standard cc/min) and the flow rate of the reaction gas is 1 to 2500 sccm (the compound gas: 1 to 1500 sccm, nitrogen gas: 1 to 1600 sccm).

It is preferable that pressure of a film-forming atmosphere is not less than 0.1 Pa and not more than 1300 Pa, not less than 1 Pa and not more than 500 Pa, or not less than 3 Pa and not more than 100 Pa. As the film-forming pressure is higher, the concentration of the reaction gas is higher. Hence, film-forming rate is high and a thick film can be formed at a practically high rate.

Moreover, upon controlling voltage for an electric discharge (discharge voltage) to not less than 1500 V, a highly oriented amorphous carbon film can be formed. Preferred discharge voltage is not less than 1750 V and more preferred discharge voltage is not less than 1900 V. As the discharge voltage is higher, orientation is higher and a dense film is efficiently formed. However, when the discharge voltage exceeds 10 kV, temperature of the substrate greatly increases and projections excessively grow, which may result in a decrease in corrosion resistance. However, if the increase in temperature of the substrate is suppressed, for example, by cooling the substrate, the decrease in corrosion resistance can be suppressed.

Upon controlling surface temperature of the substrate during formation of the oriented amorphous carbon film (film-forming temperature) to not less than 300 deg. C., the mixed layer and the projections are generated in the surface layer of the substrate during the film formation. With a film-forming temperature of less than 300 deg. C., projections do not sufficiently grow and the oriented amorphous carbon film is easily peeled off. Desired film-forming temperature is not less than 350 deg. C., not less than 375 deg. C., or not less than 390 deg. C. As the film-forming temperature is higher, the hydrogen content in the oriented amorphous carbon film decreases and electric conductivity improves. However, if the film-forming temperature exceeds 520 deg. C., due to excessive growth of projections, corrosion resistance decreases. When projections excessively grow, the compound layer also grows into a great thickness and consequently it causes a decrease in the Cr content of stainless steel. Desired film-forming temperature is not more than 500 deg. C., not more than 490 deg. C., or not more than 440 deg. C. It should be noted that the film-forming temperature can be obtained by measuring temperature of a surface of the substrate during film formation by using a thermocouple, an infrared radiation thermometer, or the like.

Moreover, film-forming time has a relation with film thickness of the oriented amorphous carbon film and degree of growth of the projections. The degree of growth of the projections also has a relation with thickness of the mixed layer. Therefore, it is preferable that the film-forming time is not less than 10 seconds and not more than 1 hour, 30 seconds to 30 minutes, or 1 to 5 minutes. Within these ranges, the oriented amorphous carbon film and the mixed layer of suitable thicknesses and the plurality of projections of a suitable length for a fuel cell bipolar plate are formed at a film-forming temperature of 300 to 520 deg. C. However, as the film-forming temperature is higher, the mixed layer and the projections more easily grow. Therefore, excessive growth of the projections and the compound layer is suppressed and corrosion resistance of a resultant fuel cell bipolar plate is maintained by suppressing the film-forming time to not more than 3 hours or not more than one hour at a film-forming temperature of 300 to 350 deg. C., not more than 2 hours or not more than 30 minutes above 350 deg. C. and at or below 400 deg. C., not more than 1 hour or not more than 15 minutes above 400 deg. C. and at or below 520 deg. C.

Hereinbefore, the modes for carrying out the fuel cell bipolar plate and the method for producing the same according to the present invention have been described, but the present invention is not limited to the above modes. For example, modes of the oriented amorphous carbon film, portions to be covered, shape of the bipolar plate and so on in the fuel cell bipolar plate of the present invention can be appropriately employed.

EXAMPLES

Hereinafter, the present invention will be specifically described by way of examples of the fuel cell bipolar plate and method for producing the same according to the present invention. First, characteristics of oriented amorphous carbon films as reference examples are specifically shown.

<<Evaluation of Oriented Amorphous Carbon Films as Reference Examples>>

A DC plasma CVD film-forming device (abbreviated as a "PCVD film-forming device") used for forming oriented amorphous carbon films and procedure for forming oriented amorphous carbon films will be described with reference to FIG. 5.

PCVD Film-Forming Device

Figure 5:
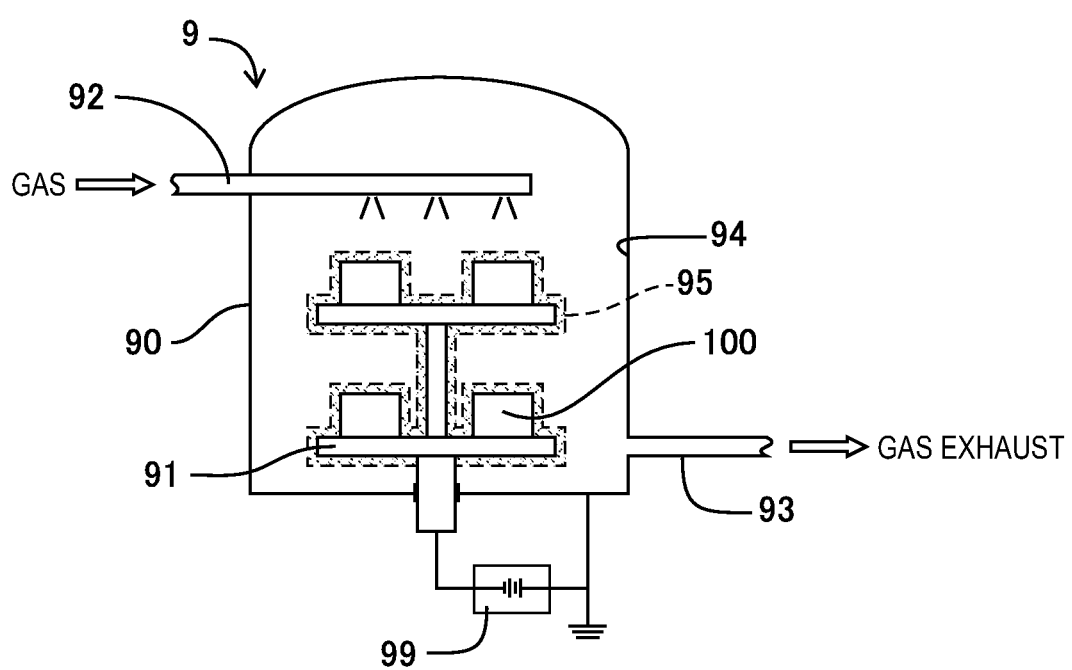
FIG. 5 is a schematic diagram of a DC plasma CVD film-forming device.

As shown in FIG. 5, a PCVD film-forming device 9 comprises a stainless steel chamber 90 having a cylindrical body, a pedestal 91, a gas inlet pipe 92, a gas outlet pipe 93, and a high voltage power supply unit 99. The gas inlet pipe 92 is connected to various kinds of gas cylinders (not shown) by way of valves (not shown). The gas outlet pipe 93 is connected to a rotary pump (not shown) and a diffusion pump (not shown) by way of valves (not shown).

The pedestal 91 for holding substrates 100 and a cylindrical anode plate 94 are provided in the chamber 90. The pedestal 91 is provided in a center portion of the chamber 90. The anode plate 94 is provided coaxially with the chamber 90 along an inner wall of the chamber 90. The pedestal 91 and the anode plate 94 are both formed of stainless steel and respectively c onnected to the high voltage power supply unit 99.

Reference Example 1

An oriented amorphous carbon film was formed on a surface of a substrate (cold-rolled steel plate: SPCC) by using the above PCVD film-forming device, thereby producing specimen No. R1.

First, the substrate (50 mm×80 mm×1.5 mm thick) was placed on the pedestal 91. Next, the chamber 90 was sealed and gas in the chamber 90 was evacuated by the rotary pump and the diffusion pump connected to the gas outlet pipe 93. After the gas evacuation to about $1\times10^{-3}$ Pa, 120 sccm of argon gas was supplied from the gas inlet pipe 92 and gas pressure was set at 11 Pa.

When a DC voltage of 200 V was applied between the pedestal 91 (cathode) and the anode plate 94, an electric discharge started. Surface temperature of the substrate was increased to a predetermined temperature by ion bombardment associated with the electric discharge. The surface temperature of the substrate was measured by an infrared radiation thermometer.

Next, in addition to argon gas, 10.7 sccm of pyridine gas and 120 sccm of nitrogen gas were introduced as reaction gas from the gas inlet pipe 92. Gas pressure at this time was 11 Pa. When a DC voltage of 3000 V (electric current: 0.4 A) was applied between the pedestal 91 (cathode) and the anode plate 94, an electric discharge 95 started around the pedestal 91 and the substrate. Surface temperature of the substrate at this time was 400 deg. C.

After a predetermined time passed from the start of the electric discharge, the electric discharge was stopped. Film-forming time was controlled with desired film thickness. Thus obtained was specimen No. R1 having an amorphous carbon film of about 1 μm in thickness on a surface of the substrate.

Reference Example 2

Specimen No. R2 was produced by a similar method to that of Reference Example 1, except that DC voltage after introducing the reaction gas was set at 2000 V (electric current: 0.35 A). A substrate during film formation had a surface temperature of 350 deg. C.

Reference Example 3

Specimen No. R3 was produced by a similar method to that of Reference Example 1, except that tetramethylsilane (TMS) was employed as reaction gas in addition to pyridine gas and nitrogen gas and DC voltage after introducing the reaction gas was set at 3000 V (electric current: 0.35 A). A substrates during film formation had a surface temperature of 400 deg. C.

Reference Example 4

Specimen No. R4 was produced by a similar method to that of Reference Example 1, except that DC voltage after introducing the reaction gas was set at 1000 V (electric current: 0.2 A). A substrate during film formation had a surface temperature of 280 deg. C.

Reference Example 5

An oriented amorphous carbon film was formed on a surface of a substrate (cold-rolled steel plate: SPCC) by using the above PCVD film-forming device, thereby producing specimen No. R5.

First, the substrate (50 mm×80 mm×1.5 mm thick) was placed on the pedestal 91. Next, the camber 90 was sealed and gas in the chamber 90 was evacuated by the rotary pump and the diffusion pump connected to the gas outlet pipe 93. After the gas evacuation to about $1\times10^{-3}$ Pa, 120 sccm of argon gas was introduced from the gas inlet pipe 92 and gas pressure was set at 11 Pa.

When a DC voltage of 200 V was applied between the pedestal 91 (cathode) and the anode plate 94, an electric discharge started. Surface temperature of the substrate was increased to a predetermined temperature by ion bombardment associated with the electric discharge. The surface temperature of the substrate was measured by the infrared radiation thermometer.

Next, the introduction of argon gas was stopped and 35 sccm of pyridine gas and 60 sccm of nitrogen gas were introduced as reaction gas from the gas inlet pipe 92. Gas pressure at this time was 11 Pa. When a DC voltage of 3000 V (electric current: 0.4 A) was applied between the pedestal 91 (cathode) and the anode plate 94, an electric discharge 95 started around the pedestal 91 and the substrate. The substrate at that time had a surface temperature of 560 deg. C.

After a predetermined time passed from the start of the electric discharge, the electric discharge was stopped. Film-forming time was controlled with desired film thickness. Thus produced was specimen No. R5 having an amorphous carbon film of about 1 μm in thickness on a surface of the substrate.

TABLE 1

| SPECIMEN NO. | FILM-FORMING METHOD | VOLTAGE (V) | REACTION GAS AND CARRIER GAS FLOW RATE (sccm) | | | | FILM-FORMING TEMP. (° C.) |
|---|---|---|---|---|---|---|---|
| | | | TMS | PYRIDINE | NITROGEN | ARGON | |
| Ref. Ex. 1 | R1 | DC PLASMA CVD | 3000 | — | 10.7 | 120 | 120 | 400 |
| Ref. Ex. 2 | R2 | DC PLASMA CVD | 2000 | — | 10.7 | 120 | 120 | 350 |
| Ref. Ex. 3 | R3 | DC PLASMA CVD | 3000 | 0.5 | 10.7 | 120 | 120 | 400 |
| Ref. Ex. 4 | R4 | DC PLASMA CVD | 1000 | — | 10.7 | 120 | 120 | 280 |
| Ref. Ex. 5 | R5 | DC PLASMA CVD | 3000 | — | 35 | 60 | — | 560 |

Evaluation

For specimen Nos. R1 to R5, film composition, film density, electric conductivity, and orientation of the amorphous carbon films were evaluated. Hereinafter, the evaluation methods will be described and the results will be shown.

Film Composition and Film Density

Measurement results of film composition of the amorphous carbon films of the respective specimens are shown in Table 2. The content of C, N and Si in the amorphous carbon films was determined by electron probe micro-analysis (EPMA), X-ray photoelectron spectroscopy (XPS), Auger electron spectroscopy (AES), and Rutherford backscattering spectroscopy (RBS). The H content was measured by elastic recoil detection analysis (ERDA). ERDA is a method of measuring the concentration of hydrogen in a film by radiating a helium ion beam of 2 MeV on a surface of the film and detecting hydrogen expelled from the film by a semiconductor detector. The amount of $Csp^2$ and the amount of $Csp^3$ were determined by the NMR spectrum which has been described in detail before.

Furthermore, density of the amorphous carbon films of the respective members was measured. The density was measured by using X-ray reflectivity method, elastic recoil detection analysis (ERDA), and Rutherford backscattering spectroscopy (RBS). The density was calculated from oscillation amplitude in an X-ray reflectivity spectrum and composition information from ERDA-RBS. The results are shown in Table 2.

TABLE 2

| SPECIMEN NO. | FILM COMPOSITION (atomic %) | | | | RATIO IN THE ENTIRE CARBON (%) | | DENSITY (g/cm³) |
|---|---|---|---|---|---|---|---|
| | Si | C | N | H | $Csp^2$ | $Csp^3$ | |
| R1 | 0 | 73 | 13 | 15 | 99 | 1 | 1.95 |
| R2 | 0 | 71 | 12 | 17 | 98 | 2 | 1.81 |
| R3 | 0.9 | 74.1 | 12 | 13 | 95 | 5 | 2.05 |
| R4 | 0 | 68 | 10 | 22 | 95 | 5 | 1.66 |
| R5 | 0 | 82 | 8 | 10 | 96 | 4 | 2.1 |

Electric Conductivity

For evaluation of electric conductivity of the respective specimens, volume resistivity and contact resistance were measured.

In general, electric resistance of a thin film formed on a surface of a substrate is measured by employing two-terminal method, four-probe method, four-terminal method or the like. Two-terminal method is to measure a voltage drop between two points, but because the voltage drop includes contact resistance between each electrode and the thin film, the two-terminal method cannot precisely measure volume resistivity of the thin film. Therefore, it has been proposed to use four-probe method (JIS K 7194, JIS R 1637) or four-terminal method (ISO 3915), which are free from effect of contact resistance. Therefore, resistance of the amorphous carbon films of the respective specimens was measured by employing four-probe method. By the way, volume resistivity of a substrate is lower than that of an amorphous carbon film. Therefore, if resistance of the film is measured as it is, an electric current also flows to a substrate side and a measured value of volume resistivity of the amorphous carbon film is lower than an actual value. Therefore, in order to measure volume resistivity of the amorphous carbon film in itself, the following treatment was applied to the respective electrically conductive members (FIG. 6).

Figure 6:
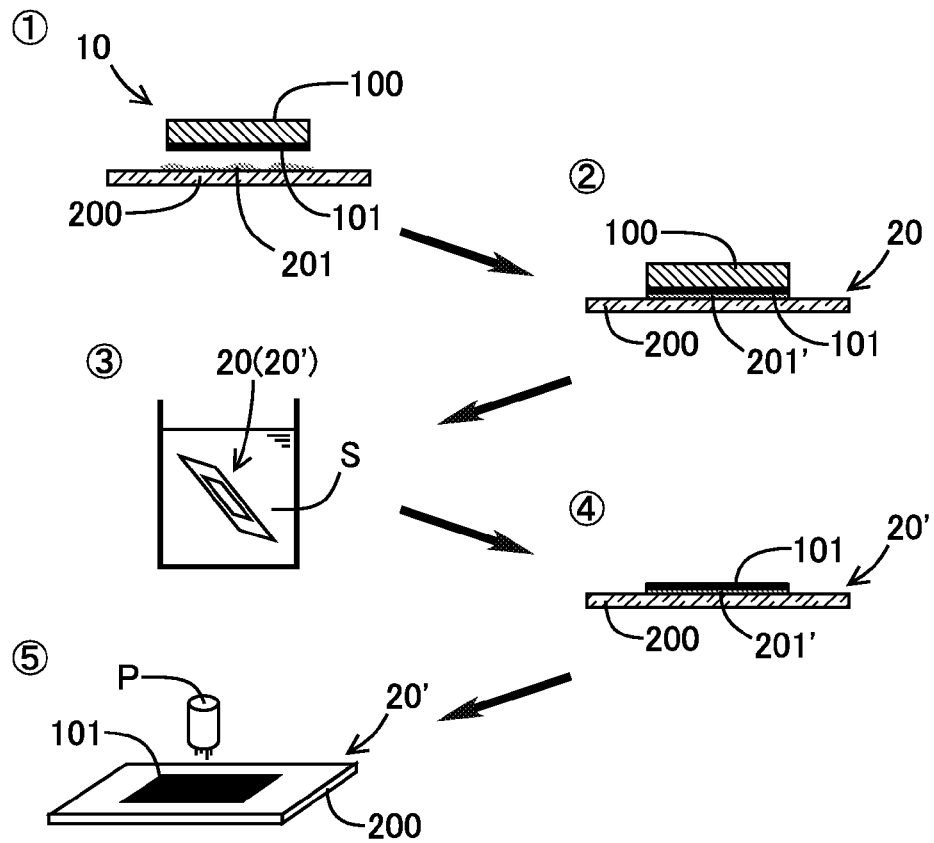
FIG. 6 is a schematic diagram illustrating procedure for preparing a test piece to be used in measuring volume resistivity.

In FIG. 6, a specimen 10 comprises a substrate 100, and an amorphous carbon film 101 formed on a surface of the substrate 100. First, a surface of a glass plate 200 and a surface of the amorphous carbon film 101 of the specimen 10 were bonded together by an adhesive 201 to produce a bonded body 20. After the adhesive 201 was sufficiently dried, the bonded body 20 was immersed in an etching solution S to etch the substrate 100, thereby obtaining a test piece 20' in which the amorphous carbon film 101 was fixed on the surface of the glass plate 200. Here, the glass plate 200 and the adhesive layer 201' formed of the employed adhesive 201 had a volume resistivity of about $10^{14}$ ohm cm, that is to say, were found to be electrically insulated. Accordingly, precise volume resistivity of the amorphous carbon film can be obtained by resistance measurement using the test piece 20'. After the test piece 20' was washed with pure water, a surface of the amorphous carbon film 101 was subjected to XPS analysis and it was confirmed that substrate components such as iron did not remain attached and structural change in carbon did not occur. It was also confirmed under an electron scanning microscope that there were no cracks in the amorphous carbon film 101. Volume resistivity of the amorphous carbon film 101 was measured by four-probe method using the thus obtained test piece 20' and applying an electric current of 100 mA to 0.1 μA. The measurement results are shown in Table 3.

It should be noted that the adhesive 201 employed was α-cyanoacrylate based adhesive, and the etching solution S employed was a ferric chloride solution. Also used was a resistivity meter equipped with a four-pin probe P (Loresta GP produced by Mitsubishi Chemical Co., Ltd.).

Figure 7:
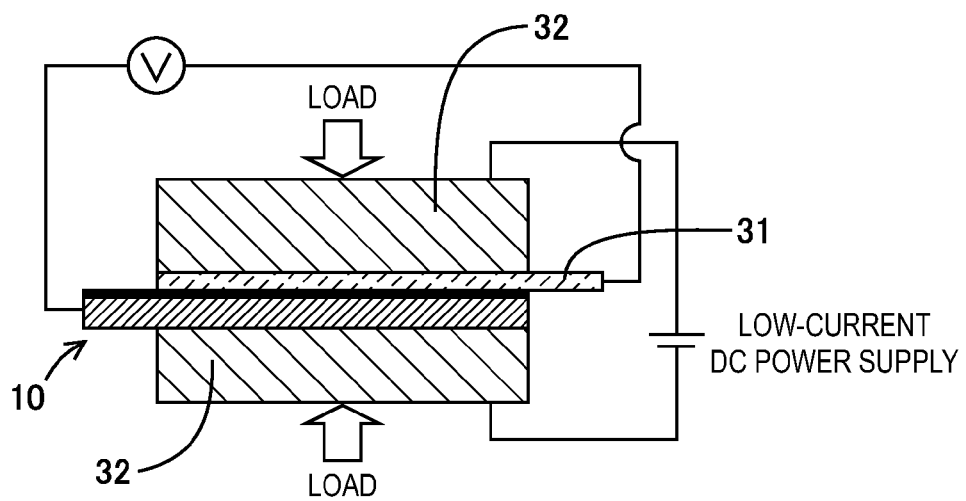
FIG. 7 is a cross sectional view schematically showing construction of a device for measuring contact resistance between an electrically conductive member and carbon paper.

Moreover, contact resistance was measured between each specimen and carbon paper, which constitutes a gas diffusion layer in a fuel cell bipolar plate. As shown in FIG. 7, the contact resistance was measured by placing carbon paper 31 on an amorphous carbon film of a specimen 10 and sandwiching them with two copperplates 32. Each of the copperplates 32 employed had a gold-plated contact surface to contact the specimen 10 or the carbon paper 31. Contact surfaces of the amorphous carbon film of the specimen 10 and the carbon paper 31 had an area of 2 cm×2 cm. A load of 1.47 MPa was applied on the two copperplates 32 in a perpendicular direction to the contact surfaces by a loadcell. Under these conditions, a direct current of 1 A was passed between the two copperplates 32 from a low-current DC power supply. A potential difference between the specimen 10 and the carbon paper 31 was measured after 60 seconds from the start of the load application, and an electric resistance value was calculated from the measured value and regarded as a contact resistance value. The measurement results are shown in Table 3.

TABLE 3

| SPECIMEN NO. | VOLUME RESISTIVITY ($\Omega$cm) | CONTACT RESISTANCE (m$\Omega$cm$^2$) |
| --- | --- | --- |
| R1 | $2.0 \times 10^{-2}$ | 6 |
| R2 | $1.6 \times 10^{-1}$ | 14 |
| R3 | $3.1 \times 10^{-1}$ | 9 |
| R4 | 3.5 | 980 |
| R5 | $9.0 \times 10^{-3}$ | 4 |

Orientation

An orientation index of each of the specimens was obtained by performing X-ray diffraction measurement.

Figure 8A:
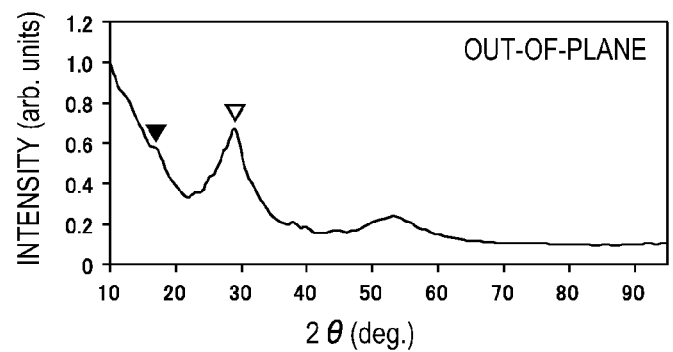
FIG. 8A is a view showing an X-ray diffraction pattern of an oriented amorphous carbon film measured by using an out-of-plane diffraction measurement method.
Figure 8B:
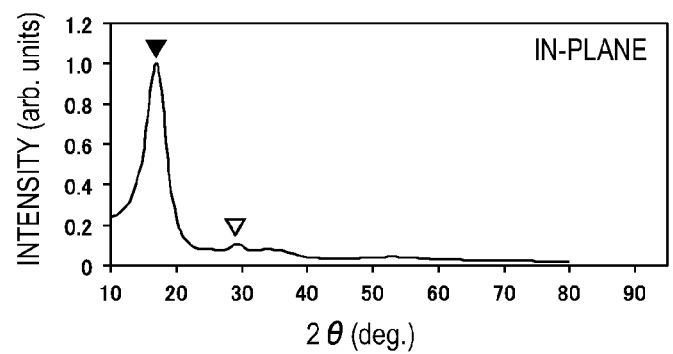
FIG. 8B is a view showing an X-ray diffraction pattern of an oriented amorphous carbon film measured by using an in-plane diffraction measurement method.

X-ray diffraction measurement was performed at SPring-8 (BL16XU and BL46XU). Two kinds of diffraction measurements, that is, out-of-plane diffraction measurement and in-plane diffraction measurement were performed on the substrate under the following conditions: incident X-ray energy: 12 keV (wavelength λ: 1.033 Å), incident angle: about 0.1 deg. (under a condition that X-ray is totally reflected by the amorphous carbon film and no X-ray diffracted by the substrate is detected), scan range: 2θ=3 deg. to 2θ=95 deg., (1 deg. per step). FIG. 8A and FIG. 8B show the results of X-ray diffraction measurements of electrically conductive member No. 01. FIG. 8A shows the result of the out-of-plane diffraction measurement, while FIG. 8B shows the result of the in-plane diffraction measurement. Peaks are observed around 2θ=17 deg. and 2θ=29 deg., and when the specimen is assumed to be 2H graphite, these peaks respectively correspond to (002) planes and (100) planes. Therefore, just a mere sight of FIG. 8B is enough to recognize that (002) planes of graphite are preferentially oriented along a thickness direction. However, in order to compare peak intensity of (002) planes and that of (100) planes more quantitatively, the respective peak intensities were calculated as follows.

Peak intensity around 2θ=17 deg. and peak intensity around 2θ=29 deg. were calculated by subtracting background from a spectrum obtained by the X-ray diffraction. Strongest intensity of each peak was regarded as intensity of each peak. Hereinafter, method for subtracting the background will be described.

The background (BG) was introduced by the following formula.

$$BG = a + (bx^2 + cx + d)/(ex^2 + fx + g)$$

In this formula, a to g are arbitrary constant numbers, x is the value of q (unit: nm$^{-1}$, the reciprocal of the value of d, where the value of d is a value which satisfies the diffraction condition 2d sin θ=nλ(Bragg's law)). The constants a to g which simultaneously satisfy the following three conditions were calculated by using the solver function of Microsoft Excel (registered trademark).

I: BG>0

II: (sig.−BG)>0, where sig. is raw data.

III: For the value of q, when x<2 or x>9.5, (sig.−BG) is a minimum

An orientation index D was calculated from the peak intensities obtained by the above method. The results are shown in Table 4.

In order to define orientation index more precisely, powder X-ray diffraction simulation of 2H graphite was performed by employing a multipurpose pattern fitting system "RIETAN-FP", which is a Rietveld analysis software (F. Izumi and K. Momma, "Three-Dimensional Visualization in Powder Diffraction" Solid State Phenom., 130, 15-20 (2007). In this analysis, a preferred orientation parameter "the value of rl" is defined as a structure parameter. The value of rl is an index of orientation and mentioned in a document (W. A. Dollase, J. Appl. Crystallogr., 19, 267 (1986)). The ratio of peak intensity of (002) planes to that of (100) planes ($I_1/I_2$) was computed while varying the value of rl from 0.5 to 5, and a relation between the value of rl and $I_1/I_2$ was approximated by the least squares method using a power function. It should be noted that the value of rl of about 1 indicates random orientation and, when random orientation is regarded as a standard, a greater value of rl indicates a stronger orientation of a-planes (i.e., (100) planes), and a smaller value of rl indicates a stronger orientation of c-planes (i.e., (002) planes).

$$rl = 2.073 \times (I_1/I_2)^{-0.222}$$

In this formula, for in-plane diffraction, rl is an orientation index r in which r=1: random orientation, r<1: c-plane orientation, r>1: a-plane orientation, $I_1$: $I_{002}$, $I_2$: $I_{100}$. For out-of-plane diffraction, rl is an orientation index r' in which r'=1: random orientation, r'<1: c-plane orientation, r'>1: a-plane orientation, $I_1$: $I_{002}$', $I_2$: $I_{100}$'. The orientation indexes r and r' are shown in Table 4.

TABLE 4

| SPECIMEN NO. | INTENSITY RATIO (IN-PLANE DIFFRACTION) $I_{002}/I_{100}$ | INTENSITY RATIO (OUT-OF-PLANE DIFFRACTION) $I_{002}'/I_{100}'$ | ORIENTATION INDEX D | ORIENTATION INDEX r | ORIENTATION INDEX r' |
| --- | --- | --- | --- | --- | --- |
| R1 | 10.0 | 0.1 | 100 | 1.2 | 3.5 |
| R2 | 6.4 | 0.7 | 9.1 | 1.4 | 2.2 |
| R3 | 7.0 | 0.2 | 35 | 1.3 | 3.0 |
| R4 | 4.8 | 5.4 | 0.9 | 1.5 | 1.4 |
| R5 | 18 | 0.02 | 900 | 1.1 | 4.9 |

Evaluation Results

The orientation index r calculated from the in-plane diffraction intensity ratio was within a range of from 1.1 to 1.5, that is to say, the value of r of all the specimens were close to 1. On the other hand, regarding the orientation index r' calculated from the out-of-plane diffraction intensity ratio, specimen No. R4 having an N-containing amorphous carbon film had an orientation index r' of 1.4, which indicates almost random orientation. Specimen Nos. R1 to R3 and R5 had orientation indexes r' of about 2.2 to 5, i.e., not less than 2. r'≥2 indicates that a-planes are preferentially oriented in parallel to the surface and there are few c-planes which are parallel to the surface. That is to say, r'≥2 indicates that c-planes are oriented in a perpendicular direction to the surface of the substrate. Furthermore, Nos. R1 to R3 and R5 had high orientation indexes D of 9 or more. Hence, it can be said that each of specimen Nos. R1 to R3 and R5 has an oriented amorphous carbon film in which (002) planes are highly oriented in a thickness direction of the film.

Specimen Nos. R1 to R3 and R5 exhibited high conductivity as indicated by very low volume resistivity in the order of $10^{-1}$ ohm cm or less. Moreover, specimen Nos. R1 to R3 and R5 also had very low contact resistance. Specimen Nos. R1 to R3 and R5 were electrically conductive members each having an amorphous carbon film containing 8 to 13 at. % of nitrogen, 10 to 17 at. % of hydrogen and having a $Csp^2$ ratio of not less than 95 at. %. Furthermore, the amorphous carbon films of specimen Nos. R1 to R3 and R5 were highly oriented as indicated by orientation indexes r' of 2 or more and orientation indexes D of 9 or more. Moreover, the amorphous carbon films of specimen Nos. R1 to R3 and R5 had film density of about 2 g/cm$^3$, and were as dense as an amorphous carbon film produced by arc ion plating or sputtering.

It should be noted that measurement of volume resistivity of each of specimen Nos. R1 to R3 and R5 was performed on the surface of the amorphous carbon film by using the above-mentioned four-probe method. Since (002) planes of graphite are highly oriented along a thickness direction in specimen Nos. R1 to R3 and R5, resistivity measured by passing an electric current in a film thickness direction is assumed to be even lower.

The amorphous carbon films of specimen Nos. R1 to R3 and R5 were formed under the following conditions: discharge voltage: not less than 2000 V, and film-forming temperature: not less than 350 deg. C. However, specimen No. R4 having an amorphous carbon film formed at a discharge voltage of 1000 V and a film-forming temperature of 280 deg. C. was inferior to specimen Nos. R1 to R3 and R5 in terms of both electric conductivity and orientation. This is believed to be because, since both electric discharge voltage and film-forming temperature were low, in spite of employing pyridine gas and nitrogen gas in combination as reaction gas, a hydrogen atom in pyridine was not smoothly replaced with a nitrogen atom. Therefore, if film-forming temperature is increased in the production method of specimen No. R4, there is a possibility that the hydrogen content is reduced and a favorable polarized state is obtained, and as a result an amorphous carbon film exhibiting sufficient electric conductivity and orientation is obtained.

Moreover, specimen No. R5 had a high film-forming temperature of 560 deg. C. and is not suitable as a method for producing a fuel cell bipolar plate of the present invention. However, it is believed that even if film-forming temperature is set in a range of from 300 to 520 deg. C. in reference example 5, an amorphous carbon film having a similar composition to that of No. R5 and exhibiting a sufficiently high electric conductivity can be obtained.

In the following examples, specimens (fuel cell bipolar plates) were produced by employing film-forming conditions which could provide an oriented amorphous carbon film on a similar level to those of the above reference examples.

EXAMPLES

Example 1

An oriented amorphous carbon film was formed on a surface of a stainless steel substrate (SUS 447 J1) by using the above PCVD film-forming device, thereby producing specimen No. 01.

First, the substrate (50 mm×80 mm×0.2 mm thick) was placed on the pedestal 91. Next, the chamber 90 was sealed and gas in the chamber 90 was evacuated by the rotary pump and the diffusion pump connected to the gas outlet pipe 93. After the gas evacuation to about $1\times10^{-3}$ Pa, 120 sccm of argon gas was introduced from the gas inlet pipe 92 and gas pressure was set at 11 Pa.

When a DC voltage of 200 V was applied between the pedestal 91 (cathode) and the anode plate 94, an electric discharge started. Surface temperature of the substrate was increased to a predetermined temperature by ion bombardment associated with the electric discharge. The surface temperature of the substrate was measured by an infrared radiation thermometer.

Next, in addition to argon gas, 10.7 sccm of pyridine gas and 120 sccm of nitrogen gas were introduced as reaction gas from the gas inlet pipe 92. The gas pressure at this time was 7 Pa. When a DC voltage of 3000 V (electric current: 0.35 A) was applied between the pedestal 91 (cathode) and the anode plate 94, an electric discharge 95 started around the pedestal 91 and the substrate. At this time, the substrate had a surface temperature of 430 deg. C.

After 30 minutes from the start of the electric discharge, the electric discharge was stopped. Thus obtained was specimen No. 01 having an oriented amorphous carbon film on a surface of the stainless steel substrate.

Examples 2 to 6 and 8

Specimen Nos. 02 to 06 and 08 were produced by a similar method to that of Example 1, except that the film-forming temperature and the film-forming time were changed. The respective film-forming conditions are shown in Table 5.

Example 7

An oriented amorphous carbon film was formed on a surface of a stainless steel substrate (SUS 447 J1) by using the above PCVD film-forming device, thereby producing specimen No. 07.

First, the substrate (50 mm×80 mm×0.2 mm thick) was placed on the pedestal 91. Next, the chamber 90 was sealed and gas in the chamber 90 was evacuated by the rotary pump and the diffusion pump connected to the gas outlet pipe 93. After the gas evacuation to about $1\times10^{-3}$ Pa, 60 sccm of argon gas was introduced from the gas inlet pipe 92 and gas pressure was set at 11 Pa.

When a DC voltage of 200 V was applied between the pedestal 91 (cathode) and the anode plate 94, an electric discharge started. Surface temperature of the substrate was increased to a predetermined temperature by ion bombardment associated with the electric discharge. The surface temperature of the substrate was measured by the infrared radiation thermometer.

Next, in addition to argon gas, 22.5 sccm of pyridine gas and 60 sccm of nitrogen gas were introduced as reaction gas from the gas inlet pipe 92. Gas pressure at this time was 7 Pa. When a DC voltage of 3000 V (electric current: 0.36 A) was applied between the pedestal 91 (cathode) and the anode plate 94, an electric discharge 95 started around the pedestal 91 and the substrate. Surface temperature of the substrate at that time was 430 deg. C.

After 4 minutes from the start of the electric discharge, the electric discharge was stopped. Thus obtained was specimen No. 07 having an oriented amorphous carbon film on the stainless steel substrate.

Example 9

An oriented amorphous carbon film was formed on a surface of a stainless steel substrate (SUS 447 J1) by using the above PCVD film-forming device, thereby obtaining specimen No. 09.

First, the substrate (50 mm×80 mm×0.2 mm thick) was placed on the pedestal 91. Next, the chamber 90 was sealed and gas in the chamber 90 was evacuated by the rotary pump and the diffusion pump connected to the gas outlet pipe 93. After the gas evacuation to about $1 \times 10^{-3}$ Pa, 60 sccm of argon gas was introduced from the gas inlet pipe 92 and gas pressure was set at 11 Pa.

When a DC voltage of 200 V was applied between the pedestal 91 (cathode) and the anode plate 94, an electric discharge started. Surface temperature of the substrate was increased to a predetermined temperature by ion bombardment associated with the electric discharge. The surface temperature of the substrate was measured by the infrared radiation thermometer.

Next, in addition to argon gas, 35 sccm of pyridine gas and 60 sccm of nitrogen gas was introduced as reaction gas from the gas inlet pipe 92. Gas pressure at this time was 7 Pa. When a DC voltage of 3000 V (electric current: 0.38 A) was applied between the pedestal 91 (cathode) and the anode plate 94, an electric discharge 95 started around the pedestal 91 and the substrate. At this time, the substrate had a surface temperature of 430 deg. C.

After two minutes from the start of the electric discharge, the electric discharge was stopped. Thus obtained was specimen No. 09 having an oriented amorphous carbon film on a surface of the stainless steel substrate.

Example 10

Specimen No. 10 was produced by a similar method to that of Example 9, except that the film-forming temperature was changed to 510 deg. C.

Example 11

Specimen No. 11 was produced by a similar method to that of Example 1, except that the substrate was changed to SUS 304 and the film-forming time was changed to 35 minutes.

Comparative Examples 1 and 3

SUS 447 J1 was used as specimen No. C1 and SUS 304 was used as specimen No. C3. That is to say, specimen No. C1 corresponded to the substrates of Examples 1 to 10 and specimen No. C3 corresponded to the substrate of Example 11, and these two specimens had no films.

Comparative Example 2

Specimen No. C2 was produced by a similar method to that of Example 1, except that the film-forming temperature was changed to 529 deg. C.

Comparative Example 4

Specimen No. C4 was produced by a similar method to that of Example 10, except that DC voltage after introduction of the reaction gas was set at 600 V (electric current: 1 A), the film-forming temperature was changed to 290 deg. C. and the film-forming time was changed to 4 minutes.

TABLE 5

|  | SPECIMEN NO. | FLOW RATE OF REACTION GAS AND CARRIER GAS (sccm) | | | FILM-FORMING TEMP. (° C.) | FILM-FORMING TIME (min) | VOLTAGE (kV) |
| --- | --- | --- | --- | --- | --- | --- | --- |
|  |  | PYRIDINE | NITROGEN | ARGON |  |  |  |
| COMP. EX. 1 | C1 | — | — | — | — | — | — |
| COMP. EX. 2 | C2 | 10.7 | 120 | 120 | 529 | 30 | 3 |
| COMP. EX. 3 | C3 | — | — | — | — | — | — |
| COMP. EX. 4 | C4 | 35 | 60 | 60 | 290 | 4 | 0.6 |
| EX. 1 | 01 | 10.7 | 120 | 120 | 430 | 30 | 3 |
| EX. 2 | 02 | 10.7 | 120 | 120 | 430 | 15 | 3 |
| EX. 3 | 03 | 10.7 | 120 | 120 | 380 | 30 | 3 |
| EX. 4 | 04 | 10.7 | 120 | 120 | 480 | 30 | 3 |
| EX. 5 | 05 | 10.7 | 120 | 120 | 430 | 8 | 3 |
| EX. 6 | 06 | 10.7 | 120 | 120 | 430 | 5 | 3 |
| EX. 7 | 07 | 22.5 | 60 | 60 | 430 | 4 | 3 |
| EX. 8 | 08 | 10.7 | 120 | 120 | 400 | 20 | 3 |
| EX. 9 | 09 | 35 | 60 | 60 | 430 | 2 | 3 |
| EX. 10 | 10 | 35 | 60 | 60 | 510 | 2 | 3 |
| EX. 11 | 11 | 10.7 | 120 | 120 | 430 | 35 | 3 |

Evaluation

Confirmation of Mixed Layer and Projections

Cross sections of the respective specimens were observed by using a transmission electron microscope (TEM) and generation of a mixed layer (a compound layer and a diffusion layer) and projections were confirmed and dimensions of the respective layers and the projections were measured. The results are shown in Table 6. Each of film thickness, projection length and width is an arithmetic mean of values obtained by measuring a plurality of portions (5 portions or more) of TEM images which respectively show different portions (3 portions or more) of a cross section. Thickness of the diffusion layer was an arithmetic mean of values obtained by measuring thickness of a plurality of portions (5 portions or more) in a region where carbon concentration measured by electron probe microanalysis (EPMA) exceeded carbon concentration of a matrix of the substrate.

Figure 10:
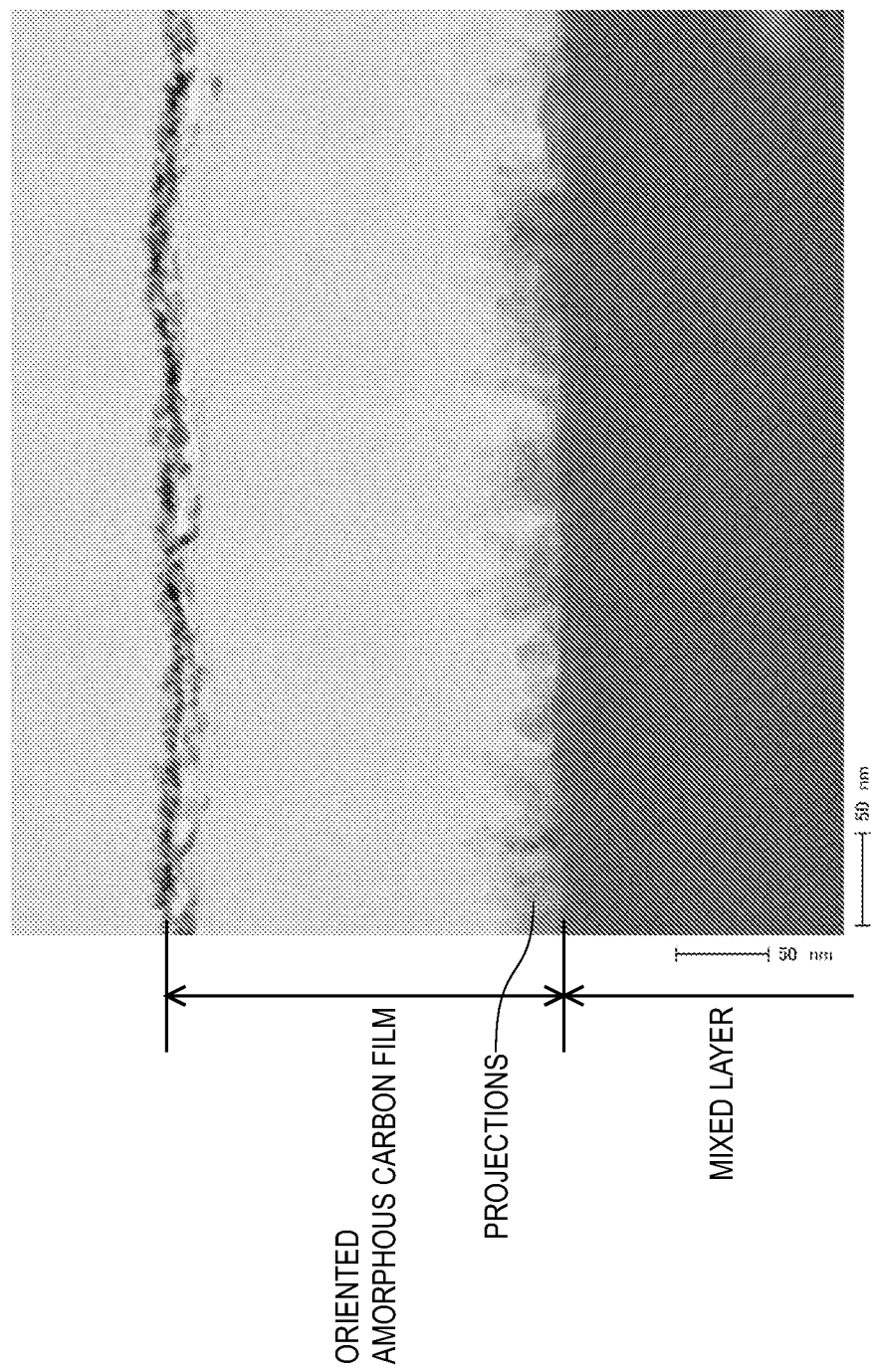
FIG. 10 is a micrograph, as a substitute for a drawing, showing a cross section of a fuel cell bipolar plate of the present invention observed by a transmission electron microscope (TEM).
Figure 11:
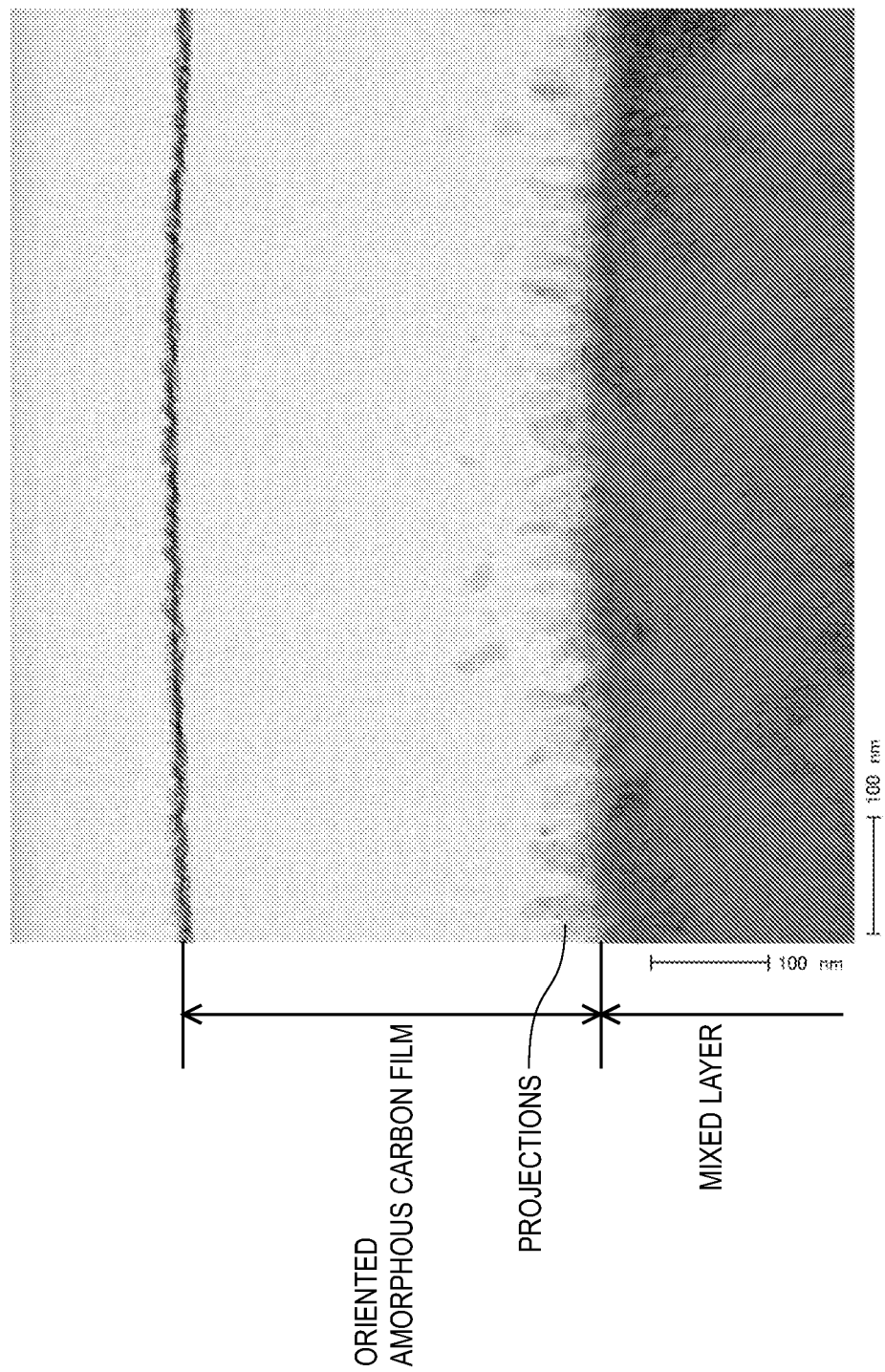
FIG. 11 is a micrograph, as a substitute for a drawing, showing a cross section of a fuel cell bipolar plate of the present invention observed by the TEM.
Figure 12:
FIG. 12 is a TEM image of the bipolar plate of FIG. 11 at a low magnification.
Figure 13:
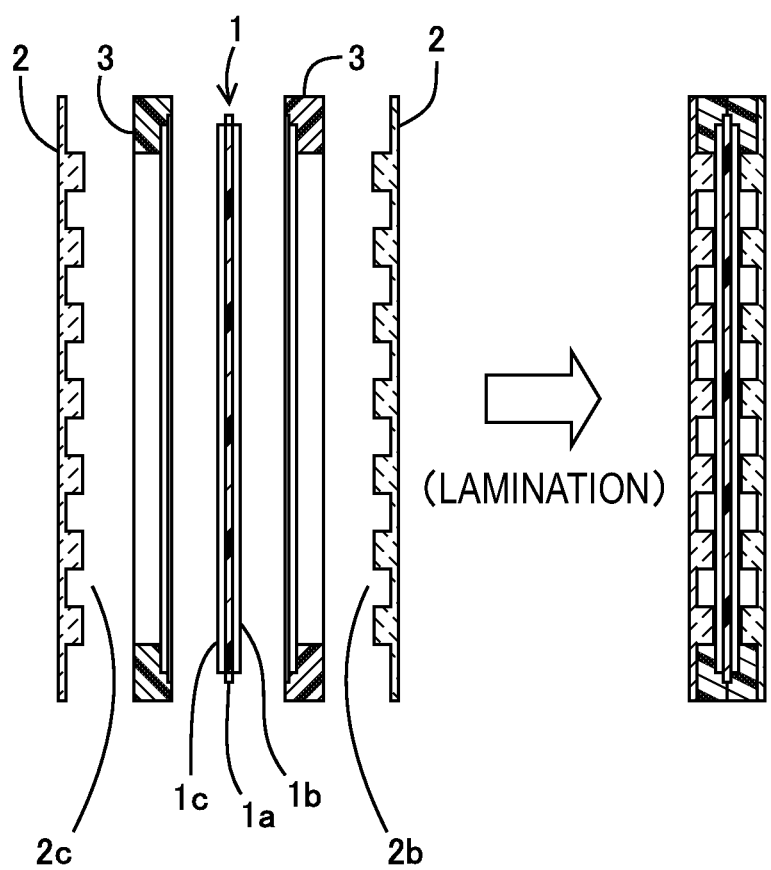
FIG. 13 is a cross-sectional view schematically showing an example of a single cell of a polymer electrolyte fuel cell.

FIG. 10 and FIG. 11 show observations of cross sections. FIG. 10 is a TEM image of a cross section of specimen No. 09. FIG. 11 and FIG. 12 are TEM images of cross sections of Specimen No. 11. Position of oriented amorphous carbon films, projections and a mixed layer (a compound layer and a diffusion layer) are shown in FIGS. 10 to 12. It was confirmed by EPMA and EELS (electron energy-loss spectroscopy) that all of the mixed layers contained C, N, Fe, Cr and O. It was confirmed by electron diffraction that $Cr_7C_3$, $Fe_3C$, $Fe_5C_2$, $Fe_2N$ as compounds were present in the mixed layers.

It should be noted that of an oriented amorphous carbon film to be formed, it is just a small portion in an interface between a substrate that plays a role in formation of a mixed layer. Therefore composition of the oriented amorphous carbon films of the respective examples are not much different from composition of the oriented amorphous carbon films of the reference examples. For example, it was confirmed that the oriented amorphous carbon films of No. R1 and No. 08 had almost the same composition.

Figure 9:
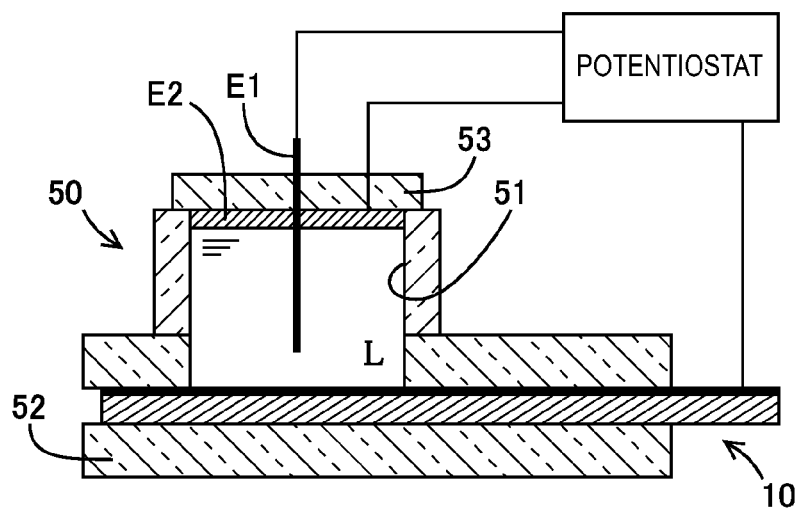
FIG. 9 is a cross-sectional view schematically showing a measurement device used in a corrosion test.

Measurement of the corrosion test was performed by using an electrochemical measuring system (HZ-3000) produced by Hokuto Denko Corporation, Japan. Also used was a measuring device shown in FIG. 9. Used as the measuring device was a measurement cell 50 having a container space 51 of 34 mm in inner diameter and 30 mm in height. Both axial end portions of the container space 51 are open and the lower axial end portion had a fixing plate 52 for fixing a test piece (specimen) 10 to the measurement cell 50. The upper axial end portion of the container space 51 had a lid 53 to which a reference electrode E1 and a counter electrode E2 are fixed. The bar-shaped reference electrode E1 is fixed in such a manner to penetrate the lid 53, and the counter electrode E2 is fixed to an inner side of the lid 53.

In order to measure a corrosion current, the container space 51 of the measurement cell 50 to which a test piece 10 was fixed was filled with an electrolyte solution L. The electrolyte solution L was prepared by adding 5 to 50 ppm of $Cl^-$ and $F^-$ to a dilute sulfuric acid in accordance with test conditions. Next, the reference electrode E1 (saturated KCl—Ag/AgCl electrode) and the counter electrode E2 (a platinum plate) were prepared and fixed to the lid 53, while the upper axial end portion of the container space 51 was capped with the lid 53. At this time, the reference electrode E1 and the counter electrode E2 were immersed in the electrolyte solution L. Terminals of the respective electrodes were connected to a potentiostat. While temperature of the electrolyte solution L was kept at 80 deg. C., a predetermined voltage (0.8 V, 0.9 V, or 1 V) was applied between the reference electrode E1 and the test piece 10 for a predetermined test time (25 hours or 100 hours). The corrosion test conditions (pH of the dilute sulfuric acid, test time and applied voltage) are shown in Table 7.

Contact resistance was measured before and after the above corrosion test. The measurement was performed by the abovementioned measuring method under the conditions: area of contact surface between the amorphous carbon film of the test piece 10 and the carbon paper 31: 10.8 $cm^2$, and load:

TABLE 6

| SPECIMEN NO. | SUBSTRATE | ORIENTED AMORPHOUS CARBON FILM THICKNESS T (nm) | MIXED LAYER COMPOUND LAYER (nm) | MIXED LAYER DIFFUSION LAYER (μm) | PROJECTION MEAN LENGTH L (nm) | PROJECTION MEAN WIDTH W (nm) | T/L |
|---|---|---|---|---|---|---|---|
| C1 | SUS447J1 | — | — | — | — | — | — |
| C2 | SUS447J1 | 450 | 1200 | 5 | 180 | 32 | 2.5 |
| C3 | SUS304 | — | — | — | — | — | — |
| C4 | SUS447J1 | 125 | 0 | 0.1 | 3 | 15 | 41.7 |
| 01 | SUS447J1 | 500 | 100 | 2 | 50 | 20 | 10.0 |
| 02 | SUS447J1 | 250 | 10 | 1.3 | 45 | 20 | 5.6 |
| 03 | SUS447J1 | 400 | 5 | 1.4 | 25 | 11 | 16.0 |
| 04 | SUS447J1 | 380 | 20 | 2.8 | 30 | 13 | 12.7 |
| 05 | SUS447J1 | 90 | 12 | 1 | 45 | 18 | 2.0 |
| 06 | SUS447J1 | 60 | 10 | 0.5 | 40 | 18 | 1.5 |
| 07 | SUS447J1 | 211 | 20 | 1 | 40 | 18 | 5.3 |
| 08 | SUS447J1 | 210 | 13 | 1.6 | 40 | 13 | 5.3 |
| 09 | SUS447J1 | 110 | 20 | 2 | 30 | 22 | 3.7 |
| 10 | SUS447J1 | 165 | 58 | 3.8 | 35 | 22 | 4.7 |
| 11 | SUS304 | 350 | 35 | 2.6 | 50 | 17 | 7.0 |

Corrosion Test

A corrosion test was performed on the respective specimens to evaluate their characteristics as fuel cell bipolar plates.

1 MPa. The measurement results are shown in Table 7. Besides, the concentration of metal ions in the electrolyte solution L after the corrosion test was measured by inductively-coupled high-frequency plasma spectrometry (ICP). The concentration of metal ions measured was those of Fe ions and Cr ions, which cause degradation of an electrolyte membrane in a fuel cell. The amounts of Fe⁻ and Cr⁻ eluted are shown in Table 7.

forming temperature of 510 deg. C. However, if the film-forming time is decreased, it is difficult to form a thick oriented amorphous carbon film unless the amount of pyridine

TABLE 7

| | | ELECTROLYTE SOLUTION: DILUTE SULFURIC ACID (pH3) + F⁻, Cl⁻ | | | | | | ELECTROLYTE SOLUTION: DILUTE SULFURIC ACID (pH4) + F⁻, Cl⁻ | | | |
|---|---|---|---|---|---|---|---|---|---|---|---|
| TEST TIME [Hr] | VOLTAGE [V] | CONTACT RESISTANCE (mΩcm²) | | AMOUNT OF IONS ELUTED (nmol/cm²/Hr) | | TEST TIME [Hr] | VOLTAGE [V] | CONTACT RESISTANCE (mΩcm²) | | AMOUNT OF IONS ELUTED (nmol/cm²/Hr) | |
| | | INITIAL STAGE | AFTER TEST | Fe | Cr | | | INITIAL STAGE | AFTER TEST | Fe | Cr |
| 25  | 0.9 | 100  | 4834  | 19.91 | 11.93 | 25  | 0.8 | 96  | 1099  | 0.024 | 2.72 |
| 25  | 0.9 | 5.3  | 4952  | 1368  | 5892  |     |     |     |       |       |      |
| 25  | 0.9 | 115  | 14094 | 24.78 | 10.57 |     |     |     |       |       |      |
| 25  | 0.9 | 2000 | *     |       |       |     |     |     |       |       |      |
| 100 | 0.9 | 4.4  | 5     | 0.05  | 0.00  | 100 | 1.0 | 3.1 | 3.6   | 0.01  | 0.04 |
| 100 | 0.9 | 4.8  | 4.9   | 0.07  | 0.00  | 100 | 1.0 | 4.8 | 5     | 0.10  | 0.15 |
| 100 | 0.9 | 15   | 6.9   | 0.09  | 0.00  |     |     |     |       |       |      |
| 25  | 0.9 | 8.7  | 9.3   | 0.26  | 0.00  |     |     |     |       |       |      |
| 100 | 0.9 | 4.8  | 10    | 3.31  | 1.70  | 100 | 1.0 | 4.8 | 214.9 | 0.08  | 0.67 |
| 100 | 0.9 | 4    | 12    | 3.05  | 1.68  |     |     |     |       |       |      |
| 100 | 0.9 | 9.9  | 3.9   | 2.86  | 1.42  |     |     |     |       |       |      |
| 100 | 0.9 | 6.6  | 5.4   | 0.94  | 0.44  | 100 | 0.8 | 5.3 | 4     | 0.02  | 0.00 |
| 100 | 0.9 | 12.1 | 15.4  | 3.00  | 0.78  |     |     |     |       |       |      |
| 100 | 0.9 | 4.1  | 11.1  | 4.05  | 0.56  |     |     |     |       |       |      |
| 25  | 0.9 | 6.6  | 7.5   | 0.29  | 0.08  | 25  | 0.8 | 6.6 | 4.6   | 0.01  | 0.00 |

*: FILM PEELED

A plurality of projections were confirmed in the TEM images of all the specimens. However, the projections of specimen No. C4 had a mean length of only 3 nm. Consequently, the oriented amorphous carbon film was peeled off during the corrosion test. On the other hand, specimen No. C2 had long projections having a mean length of 180 nm. However, the amount of ions eluted after the corrosion test was greater than that of specimen No. C1 or No. C3, which had no film on a surface. This is because a thick compound layer was generated together with the projections and the Cr content of the stainless steel substrate was decreased, and as a result corrosion resistance was decreased. Since no compound was confirmed in specimen No. C4 in which projections did not grow greatly, it was found out that as projections are longer, a thicker compound layer is generated.

Specimen Nos. 01 to 11 all exhibited good corrosion resistance. Especially, in specimen Nos. 01 to 04 and 11, the amount of Cr ions eluted after the corrosion test was suppressed to less than 0.1 nmol/cm²/Hr and the amount of Fe ions eluted was also as low as less than 0.3 nmol/cm²/Hr. In these specimens, ratio (T/L) of thickness of the oriented amorphous carbon film to a mean length of the projections was 5.6 to 16. Especially specimen Nos. 01 and 02 kept to have a contact resistance of about 5 mohm cm² before and after the corrosion test. The ratio T/L of these specimens was 5.6 to 10. That is to say, it has been found out that even if projections grow greatly and a thick compound layer, which reduces the Cr amount and lowers corrosion resistance of a substrate, is generated, a fuel cell bipolar plate exhibiting a good corrosion resistance can be obtained by forming a dense oriented amorphous carbon film having a sufficient thickness.

Specimen Nos. 05 to 07, 09 and 10 were produced with film-forming time of less than 10 minutes. Because of the decrease in film-forming time, generation of the compound layer was reduced in these specimens. For example, because the film-forming time was 2 minutes, specimen No. 10 had a compound layer thickness of 58 nm in spite of a high film-supplied is increased. Therefore, the corrosion resistance of specimen Nos. 05 and 06 was lower than those of other specimens. Note that, it has been found out that a bipolar plate having a good corrosion resistance such as Nos. 01 to 04, 08 and 11 can be obtained in a film-forming time of about 12 to 40 minutes.

Moreover, specimen Nos. 01, 04, 10 and 11 exhibited sufficient corrosion resistance for a fuel cell bipolar plate, though their diffusion layers had a thickness of not less than 2 μm and a lot of C and N are assumed to have been diffused into surface layers of the substrates. This is because not only C, which causes a decrease in the Cr content, but also N diffused into the stainless steel substrates.

The invention claimed is:

1. A bipolar plate for a fuel cell, comprising:
   a substrate formed of stainless steel;
   an oriented amorphous carbon film formed at least on a surface of the substrate facing an electrode, and containing carbon as a main component, 3 to 20 at. % of nitrogen, and more than 0 at. % and not more than 20 at. % of hydrogen, and when the total amount of the carbon is taken as 100 at. %, the amount of carbon having an $sp^2$ hybrid orbital being not less than 70 at. % and less than 100 at. %, and (002) planes of graphite being oriented along a thickness direction;
   a mixed layer generated in a boundary of the substrate and the oriented amorphous carbon film and containing at least one kind of constituent atoms of each of the substrate and the oriented amorphous carbon film; and
   a plurality of projections protruding from the mixed layer into the oriented amorphous carbon film and having a mean length of 10 to 150 nm.

2. The bipolar plate for a fuel cell according to claim 1, wherein the mixed layer has a diffusion layer in which at least carbon and nitrogen are diffused into a surface layer of the substrate.

3. The bipolar plate for a fuel cell according to claim 1, wherein the mixed layer has a compound layer containing at least one kind of compound selected from compounds comprising combinations of at least one kind of atoms selected from constituent atoms of the substrate, and at least one kind of atoms selected from constituent atoms of the oriented amorphous carbon film and oxygen atoms.

4. The bipolar plate for a fuel cell according to claim 1, wherein ratio of thickness of the oriented amorphous carbon film to a mean length of the plurality of projections is 1 to 30.

5. The bipolar plate for a fuel cell according to claim 1, wherein the substrate is formed of ferrite stainless steel, austenite stainless steel, martensite stainless steel or duplex stainless steel.

6. A fuel cell, comprising the bipolar plate for a fuel cell according to claim 1.

7. A method for producing the bipolar plate for a fuel cell according to claim 1 by DC plasma CVD method, comprising:

placing the substrate in a reaction vessel, introducing reaction gas comprising at least one compound gas selected from the group consisting of gases of carbocyclic compounds containing carbon having an $sp^2$ hybrid orbital and gases of N-containing heterocyclic compounds containing carbon having an $sp^2$ hybrid orbital and nitrogen, and nitrogen gas into the reaction vessel, and generating an electric discharge by applying a voltage of not less than 1500 V, thereby forming the film on the substrate having a temperature of 300 to 520 deg. C.

8. The method for producing the bipolar plate for a fuel cell according to claim 7, wherein the compound gas contains at least one kind of gas selected from the gases of N-containing heterocyclic compounds.

9. The method for producing the bipolar plate for a fuel cell according to claim 8, wherein the compound gas contains pyridine gas.

* * * * *

UNITED STATES PATENT AND TRADEMARK OFFICE
CERTIFICATE OF CORRECTION

PATENT NO. : 8,993,197 B2
APPLICATION NO. : 13/511175
DATED : March 31, 2015
INVENTOR(S) : Takashi Iseki et al.

It is certified that error appears in the above-identified patent and that said Letters Patent is hereby corrected as shown below:

In the Specification,

At column 9, line 47, change "$I_{002}. I_{100}$" to -- $I_{002}, I_{100}$ --.

Signed and Sealed this
Twenty-ninth Day of September, 2015

Michelle K. Lee
*Director of the United States Patent and Trademark Office*